(12) United States Patent
Vidal Rojas et al.

(10) Patent No.: US 12,539,981 B2
(45) Date of Patent: Feb. 3, 2026

(54) AUTONOMOUS, ELECTRIC VEHICLE FOR AVIATION-RELATED APPLICATIONS

(71) Applicant: Moonware, Inc., Boston, MA (US)

(72) Inventors: Javier Vidal Rojas, Boston, MA (US); Saunon Rod Malekshahi, Boston, MA (US); Andrew Arnold, Boston, MA (US); Dimitrios Bailas, Boston, MA (US); Atanaz Bohlooli, Boston, MA (US); Camille Carr, Boston, MA (US); Orhan Elam, Boston, MA (US); Dima Fayyad, Boston, MA (US); Marc Jabbour, Boston, MA (US); Lucas Liu, Boston, MA (US); Berke Ozdemir, Boston, MA (US); Vedant Singh, Boston, MA (US); Philipp Haban, San Francisco, CA (US); Matthew Derkach, San Francisco, CA (US)

(73) Assignee: Moonware, Inc., Boston, MA (US)

( * ) Notice: Subject to any disclaimer, the term of this patent is extended or adjusted under 35 U.S.C. 154(b) by 218 days.

(21) Appl. No.: 18/110,319

(22) Filed: Feb. 15, 2023

(65) Prior Publication Data

US 2023/0303267 A1  Sep. 28, 2023

Related U.S. Application Data

(63) Continuation of application No. PCT/US2021/047346, filed on Aug. 24, 2021.
(Continued)

(51) Int. Cl.
*B64F 1/228* (2024.01)
*B60P 3/11* (2006.01)
*G05D 1/00* (2024.01)

(52) U.S. Cl.
CPC ............... *B64F 1/228* (2013.01); *B60P 3/11* (2013.01); *G05D 1/0276* (2013.01)

(58) Field of Classification Search
CPC .......... B64F 1/228; B60P 3/11; G05D 1/0276
See application file for complete search history.

(56) References Cited

U.S. PATENT DOCUMENTS 4,036,384 A   7/1977   Johnson
5,346,354 A   9/1994   Hellstrom
(Continued)

FOREIGN PATENT DOCUMENTS

DE   102008035342 A1   2/2010
EP        1623924 A1   2/2006
(Continued)

OTHER PUBLICATIONS

"AnyTRACS airport technologies," website landing page, http://www.anytracs.com/, 2019, 1 page.
(Continued)

*Primary Examiner* — Peter D Nolan
*Assistant Examiner* — Mikko Okechukwu Obioha
(74) *Attorney, Agent, or Firm* — COOLEY LLP

(57) ABSTRACT

An autonomous vehicle includes a chassis for housing an aircraft ground contacting structure (GCS) and one or more GCS coupling and lifting mechanisms, GCS securing mechanisms, drivetrain, batteries and a sensor stack for performing autonomous navigation. Further, the vehicle incorporates multiple sensors, such as high-resolution machine vision cameras, GPS modules, Lidars, ultrasonic range sensors, and radars. The sensors deliver spatial perception capabilities to the vehicle and feed relevant data to onboard computing units to achieve location-based navigation, precision alignment with aircraft, obstacle detection and collision avoidance capabilities. A series of batteries
(Continued)

deliver power to all components, including but not limited to, motors, electromechanical units, onboard computers, sensors and any other component requiring electrical input. External ports allow the vehicle to recharge batteries after each utilization cycle without replacement. The vehicle is capable of recognizing its power state and can autonomously navigate to a base station and dock itself for charging.

21 Claims, 39 Drawing Sheets

Related U.S. Application Data

(60) Provisional application No. 63/070,016, filed on Aug. 25, 2020.

(56) References Cited

U.S. PATENT DOCUMENTS

| | | | |
|---|---|---|---|
| 6,928,363 | B2 | 8/2005 | Sankrithi |
| 11,307,596 | B2* | 4/2022 | Mackin ................ H04L 67/125 |
| 2008/0099600 | A1 | 5/2008 | Perry et al. |
| 2011/0015816 | A1* | 1/2011 | Dow ........................ G05D 1/00 |
| | | | 701/23 |
| 2011/0127366 | A1* | 6/2011 | Becker .................... G08G 5/51 |
| | | | 244/50 |
| 2012/0119018 | A1 | 5/2012 | Perry et al. |
| 2012/0215393 | A1 | 8/2012 | Schiedegger |
| 2014/0048342 | A1 | 2/2014 | Chan et al. |
| 2017/0057663 | A1 | 3/2017 | Alonso Tabares et al. |
| 2020/0331630 | A1* | 10/2020 | Ricaud .................... B64F 1/002 |
| 2021/0130008 | A1* | 5/2021 | Schickling ............ G05D 1/024 |
| 2021/0354807 | A1* | 11/2021 | Collins .................... B60L 9/00 |
| 2022/0309931 | A1* | 9/2022 | T ............................ G08G 5/727 |

FOREIGN PATENT DOCUMENTS

| | | |
|---|---|---|
| FR | 2675919 A1 | 10/1992 |
| WO | WO-2022046765 | 3/2022 |

OTHER PUBLICATIONS

Cramer, Thomas, "Anytracs Flugzeugschlepper GPS-gesteuert unbemann," [video] uploaded via YouTube, Sep. 11, 2013, retrieved on Oct. 5, 2023, at https://www.youtube.com/watch?v=nnRv8PAXq5w (video only, no text or speech), 10 pages of screenshots.

Extended European Search Report for European Application No. EP21862568.9, mailed Mar. 7, 2024, 9 pages.

International Preliminary Report on Patentability for International Application No. PCT/US2021/047346, mailed Mar. 9, 2023, 13 pages.

International Search Report and Written Opinion for International Application No. PCT/US2021/047346, mailed Dec. 16, 2021, 18 pages.

Third Party Observations in EP Application No. 20210862568, mailed Aug. 27, 2023, 3 pages.

* cited by examiner

AUTONOMOUS, ELECTRIC VEHICLE FOR AVIATION-RELATED APPLICATIONS

CROSS-REFERENCE TO RELATED APPLICATIONS

This application is a Continuation of International Patent Application No. PCT/US2021/047346, entitled "Autonomous, Electric Vehicle for Aviation-Related Applications," filed on Aug. 24, 2021, which claims priority to U.S. Provisional Patent Application Ser. No. 63/070,016, entitled "Autonomous, Electric Vehicle for Aviation-Related Applications," filed on Aug. 25, 2020, the disclosure of which is incorporated by reference herein in its entirety.

TECHNICAL FIELD

The present disclosure relates to an autonomous electric vehicle in general, and to one designed for aircraft servicing applications in particular.

BACKGROUND

Autonomous or self-driving vehicles have burgeoned into two principal sectors, most notably in the automotive and trucking sectors for ridesharing and logistical delivery applications, respectively. Autonomous fleet solutions have also found factory and warehouse automation applications, with multiple robots collaborating in swarms or clusters to collaboratively achieve rudimentary movement tasks.

Ground handling is a sector where autonomous solutions are largely nonexistent. This highlights a relevant scope of operations in which different types of aircraft can be serviced autonomously, effectively replacing human ramp labor.

Attempts at developing unmanned solutions have consisted of tugs operated via radio control by human ramp agents, or existing vehicles retrofitted with perception sensor stacks. The former systems do not remove the human from the loop, and the latter suffer from a top-down approach to automating a vehicle that is limited in functionality, redundancy, and network-based collaboration.

The emerging Urban Air Mobility (UAM) sector faces a significant ground handling problem regarding the movement of Vertical Take Off & Landing (VTOL) aircraft on ground surfaces. VTOLs are aerial vehicles with weight classes comparable to those of general aviation that will operate from skyports (also called vertiports) with designated Final Approach & Take-Off (FATO) pads and parking spaces or parking stands. Future VTOLs will be electric (eVTOLs), and thus very weight restricted. Because of this, many functionalities will be offloaded to the ground in order to reduce weight and complexities, improving range and performance. As a result, they will not have powered landing gear and will be unable to independently locomote on skyport surfaces.

Furthermore, skyports will be located in dense urban environments with limited real estate, which will make them severely constrained in surface area. Given the projected high flight volumes for the UAM sector, this will induce significant delays as well as high vehicle congestion. Therefore, the ability to autonomously move eVTOLs in skyports will be an operational requirement for this industry.

Additionally, ground handling operations in the general and commercial aviation sectors suffer from similar problems. COVID-19 losses have taught key lessons for this industry, namely revealing the fragility of human-intensive processes, which is now set to prioritize massive cost reductions and undergo operational reforms. Among these which can be highlighted are the uncoordinated ground handling operations, which cost airlines $30B+every year, with the following breakdown: delays, caused by rudimentary manual labor, cost airlines globally $11B annually, equivalent to 30 M minutes; accidents cost airlines globally $12.5B annually both in terms of reparations and aircraft downtime, where 92% of accidents involving ramp damage to aircraft and terminal buildings can be attributed to human errors; and high taxiing fuel costs, which amount to $6.5B globally every year, on top of emissions and environmental costs associated with such activities.

SUMMARY

Some embodiments described herein refer to the application of a fleet solution for vehicles, such as electric, self-driving vehicles, working collaboratively to achieve aircraft-servicing applications in airports, skyports, vertiports, heliports, and other air centers. The vehicle includes a chassis designed to support an aircraft ground contacting structure (GCS), which may include nose landing gear (NLG), landing skids (skids), floats, or any other structures for supporting an aircraft on the ground or liquid (water). Further, the autonomous vehicle may be configured to include mechanisms that couple, lift, and secure the GCS to the vehicle, one or more drivetrain units, a power source (such as a battery pack), and a sensor stack used to enable autonomous navigation.

In order to achieve autonomous capabilities, the vehicle can incorporate one or more sensors, including but not limited to high resolution machine vision cameras, GPS modules, Lidars, ultrasonic range sensors, and radars. This array of sensors can deliver spatial perception capabilities to the vehicle, which feed relevant data to onboard computing units to achieve location-based navigation, precision alignment with aircraft, obstacle detection and collision avoidance capabilities, among other capabilities.

An autonomous vehicle is configured to include an energy source. The energy source (such as one or more batteries) can supply energy/power to all components, including but not limited to motors, electromechanical units, onboard computers, sensors, and any other component requiring electrical input. External ports can allow the vehicle to replenish the energy source (e.g., recharge batteries) after each utilization cycle without replacement. The vehicle is capable of recognizing its energy state and can autonomously navigate to a base station and dock itself for energy replenishment. Alternatively, a human operator can manually replenish the energy source.

In an example embodiment, an autonomous vehicle (herein also referred to as the vehicle) is an ideal test case for the Urban Air Mobility (UAM) ecosystem. High flight volumes in skyports coupled with limited real estate call for efficient movement of eVTOLs between their parking zones and FATOs to avoid traffic, congestion, and safety hazards. The vehicle solves the inefficiencies in ground handling that arise from human-induced errors. Additionally, the vehicle eliminates eVTOL propulsor use for ground operations, which reduces the net acoustic footprint of skyports and airports and further reduces aircraft energy consumption, increasing range.

The vehicle can be scaled for deployment in conventional airports and can solve the taxiing challenges in this environment as well. Collaborative task completion with a fleet of vehicles enables a system that adapts to different ramp operations such as tugging, pushback, wheel chocking, and marshalling. The novel coupling mechanism reduces aircraft landing gear fatigue versus conventional tugging techniques, increasing the service life of the system and decreasing maintenance. Automating such services through an end-to-end cloud-based network streamlines ground operations, which can: (1) reduce delays and ramp congestion; (2) enable larger flight volumes; and (3) replace ramp operators, tug drivers, and wing spotters, effectively cutting these labor costs.

Skyports and airports mutually present favorable constraints for automation. Clearly outlined vehicle protocols provide a largely controlled environment that reduces the number of potential self-driving anomalies when compared to public roads. The vehicles are designed with safety in mind to prevent commonplace accidents such as tail-strikes, wing-strikes, and other expensive structural damages.

Consistent with a disclosed embodiment, an autonomous vehicle is provided. The vehicle includes a chassis for supporting a ground contacting structure of an aircraft, the chassis including a housing for holding the ground contacting structure and a coupling mechanism. The coupling mechanism is configured to facilitate placing the ground contacting structure into the housing and secure the ground contacting structure in the housing.

Consistent with another disclosed embodiment, an autonomous vehicle includes a chassis for supporting a ground contacting structure of an aircraft. The chassis includes a housing configured to hold the ground contacting structure and a coupling mechanism configured to facilitate placing the ground contacting structure into the housing and secure the ground contacting structure in the housing. Further, the autonomous vehicle includes a control system operatively coupled to the housing coupling mechanism configured to perform control operations including receiving instructions for towing the aircraft, the instructions including a location to which the aircraft is to be towed, identifying the ground contacting structure of the aircraft using data provided from sensors associated with the control system, and sending signals to the coupling mechanism for engaging the ground contacting structure using the coupling mechanism. Further the control system performs operations of sending signals to the coupling mechanism for placing the ground contacting structure into the housing and operating a drivetrain of the autonomous vehicle for towing the aircraft to the location.

Consistent with another disclosed embodiment, a system for towing an aircraft is provided. The system includes a set of sensors for determining a location of a ground contacting structure of the aircraft, and a type of the ground contacting structure. Further, the system includes an autonomous vehicle. The vehicle includes a chassis for supporting the ground contacting structure of the aircraft, the chassis having a housing for holding the ground contacting structure and a coupling mechanism configured to facilitate placing the ground contacting structure into the housing and secure the ground contacting structure in the housing. Further, the system includes a control system configured to perform control operations including receiving instructions for towing the aircraft, the instructions including a parking location to which the aircraft is to be placed and deploying the autonomous vehicle towards the location of the ground contacting structure of the aircraft. Additionally, the control system is configured to perform operations including sending signals to the coupling mechanism for engaging the ground contacting structure using the coupling mechanism, sending signals to the coupling mechanism for placing the ground contacting structure into the housing, and operating a drivetrain of the autonomous vehicle for towing the aircraft to the location.

DETAILED DESCRIPTION

Some embodiments described herein relate to an autonomous, electric vehicle for aviation-related applications. The vehicle consists of hardware (including mechanical and electrical) and software aspects. These aspects are described in turn below.

Hardware

Figure 1A:
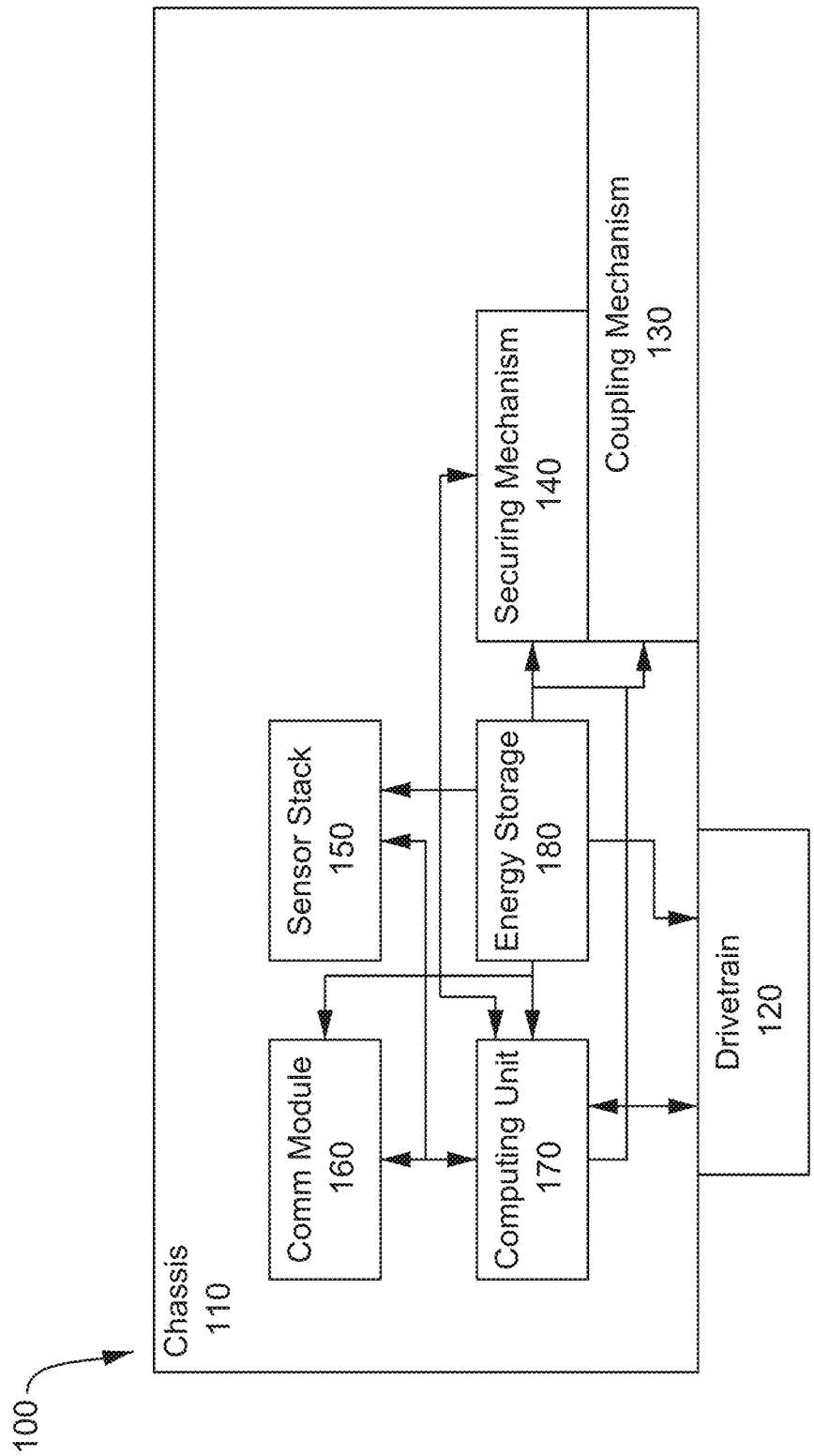
FIG. 1A is a schematic block diagram of an overall architecture of a vehicle according to an embodiment, showing subsystem modules.
Figure 1B:
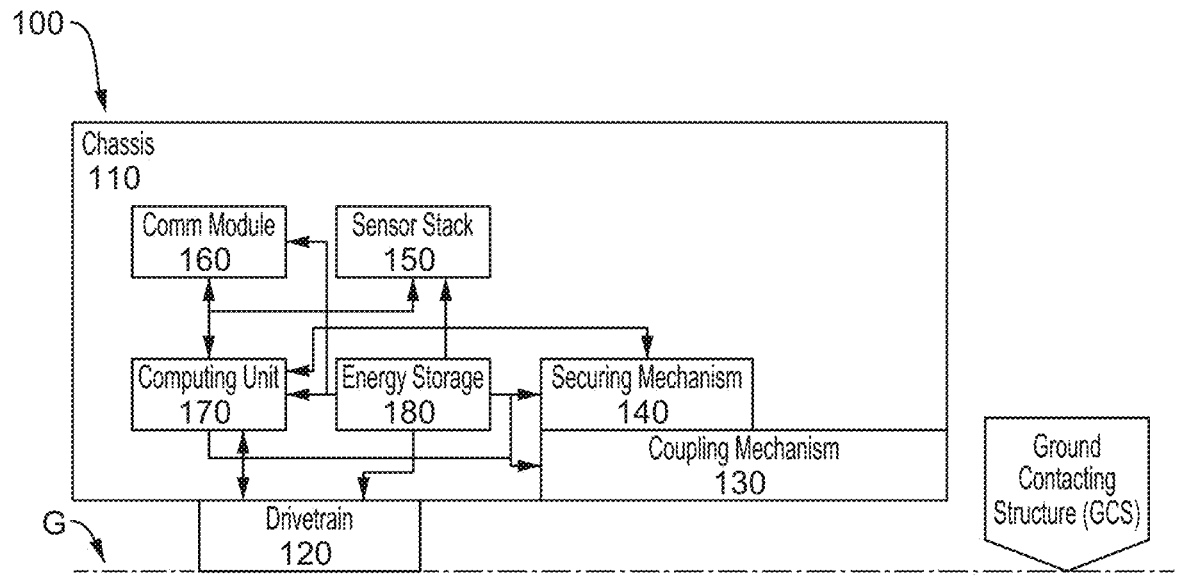
FIGS. 1B and 1C are schematic block diagrams of the vehicle of FIG. 1A, schematically illustrating interaction with the nose landing gear of an aircraft.
Figure 1C:
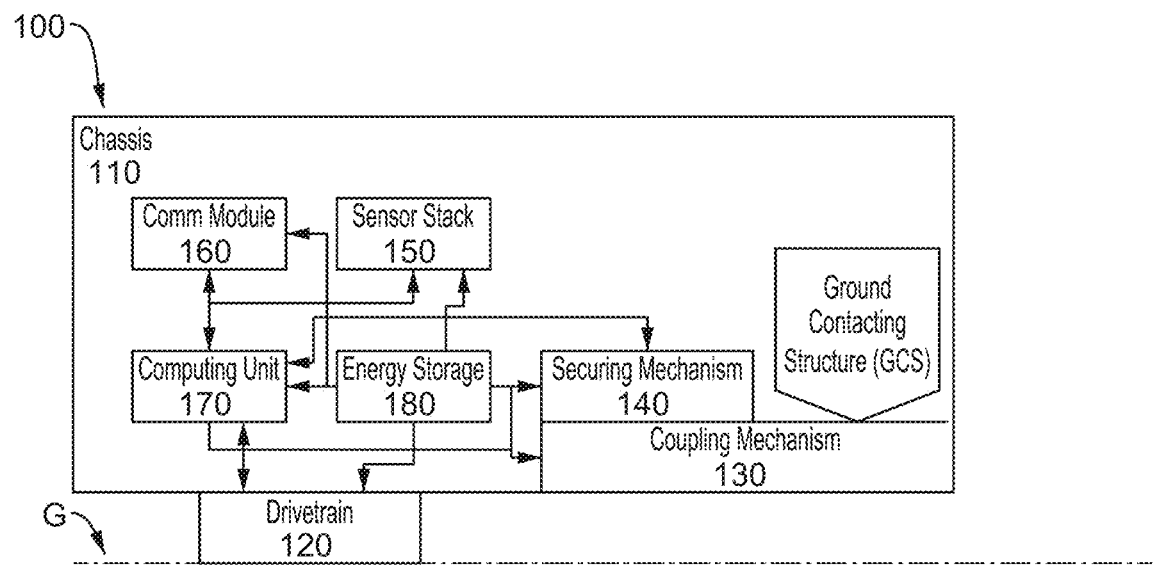

A vehicle 100, according to an embodiment, is illustrated schematically in FIGS. 1A to 1C. Vehicle 100 includes a chassis 110, a drivetrain 120, a coupling mechanism 130, a securing mechanism 140, a sensor stack 150, a communications (comm) module 160, a computing unit 170, and an energy storage 180.

The chassis 110 serves as the main frame for the vehicle 100, and houses and supports all of the other components. It is designed to support the weight of the GCS of the aircraft to be moved by the vehicle 100, which in turn means that it supports the portion of the weight of the aircraft that is supported by its GCS.

Drivetrain 120 is coupled to chassis 110 and functions to support vehicle 100 and the GCS of the aircraft, and to provide motive force to move the vehicle 100 and the aircraft along the ground G from an initial location to one or more desired other locations. The "ground" G can be any surface on which the aircraft may be positioned and repositioned around a vertiport or airport (as described in more detail below), typically a hard surface such as concrete.

Coupling mechanism 130 is part of chassis 110 and functions to engage and couple with the GCS of the aircraft, to lift the GCS off of the ground G and hold the GCS in an engaged, transport position on the vehicle 100. Relatedly, securing mechanism 140 is coupled to chassis 110 adjacent to coupling mechanism 130 and functions to engage with the GCS of the aircraft and secure it in the transport position on the vehicle 100 (as shown schematically in FIGS. 1B and 1C). With the GCS of the aircraft in the transport position on vehicle 100, the portion of the aircraft's weight borne by the vehicle provides a normal force between ground G and the ground-engaging portion of drivetrain 120. This normal force produces a maximum frictional force (static or dynamic depending on whether vehicle 100 is stationary or moving) to resist the propulsive force applied by drivetrain 120 to the ground G to move vehicle 100 and the aircraft. Without this application of the aircraft's weight to the vehicle 100, the propulsive force that could be applied by vehicle 100 would depend on the weight of vehicle 100 itself, thus requiring a heavier vehicle to produce substantial propulsive force, or less than desirable propulsive force. In many applications, it is preferable to minimize the use of the aircraft's main propulsion units (propellers, fans, etc.) to move the aircraft along the ground, e.g., to reduce noise, fuel consumption, and risk of damage to the aircraft and injury to ground personnel. Therefore, in many embodiments, vehicle 100 is capable of engaging with the GCS of the aircraft and lifting and securing it while the aircraft is stationary. This may entail having the aircraft hold its position through the application of brakes on the main landing gear while allowing the GCS to freely rotate. The vehicle 100 can then be driven into position adjacent GCS, the coupling mechanism 130 operatively engaged with the GCS, and then the GCS moved into the transport position on the vehicle 100 by driving the vehicle 100 (with the drivetrain 120) into and under the GCS and/or moving the coupling mechanism 130 relative to chassis 110 and/or the GCS.

Sensor stack 150 can include one or more sensors by which vehicle 100 can determine the location of the vehicle 100 in its environment, the location of the aircraft (and particularly the GCS of the aircraft) with which the vehicle is to engage and transport, other aircraft, vehicles, persons and other objects, stationary or moving, in the environment. A variety of sensor types may be used to collect information for these purposes, including global positioning system (GPS) receiver(s) 151, Lidar(s) 152, camera(s) 153 (including visible, IR, and/or other portions of the light spectrum), ultrasonic sensor(s) 154, radar(s) 155, inertial measurement unit(s) 156, etc.

Comm module 160 can include modules for one or more communication modalities by which vehicle 100 can communicate with other vehicles (e.g., for mission coordination, collision avoidance), with a central control function at the aircraft facility (e.g., airport ground control), aircraft (the aircraft to be transported by the vehicle and/or other aircraft at the facility), personnel at the aircraft facility, etc. Communication modalities may include WiFi 161, Bluetooth 162, cellular 163, radio 164, speaker 165, near-field communication, etc.

Computing unit 170 can receive inputs from and provide control instructions to, the other components of vehicle 100, and can include modules to perform various functions based on the inputs from other components and generate instructions to be provided to the other components. Such modules can include an autopilot module 171, a controller module 172, and an onboard computer module 173.

Energy storage 180 can provide energy to the other components of vehicle 100 for the duration of the mission or operating cycle of vehicle 100 and can be replenished between missions or operating cycles from a suitable source at the aircraft facility in which vehicle 100 operates. Energy storage 180 may include one or more batteries, and, thus, store electrical energy and supply electrical energy to the other components, for example, to an electrical motor associated with drivetrain 120, electrically-driven actuators associated with coupling mechanism 130 and/or securing mechanism 140, and/or operating power for sensors in sensor stack 150, communication module 160, and/or computing unit 170. In some embodiments, energy storage 180 can be implemented with other mechanisms to produce electrical energy, e.g., a fuel cell, a generator powered by an internal combustion engine, etc. It may also include stored energy in the form of chemical energy, such as gaseous or liquid hydrogen or hydrocarbon fuel(s), to generate electricity within energy storage 180, and/or to be supplied directly to other components, for example, an internal combustion engine associated with powertrain 120.

Figure 2:
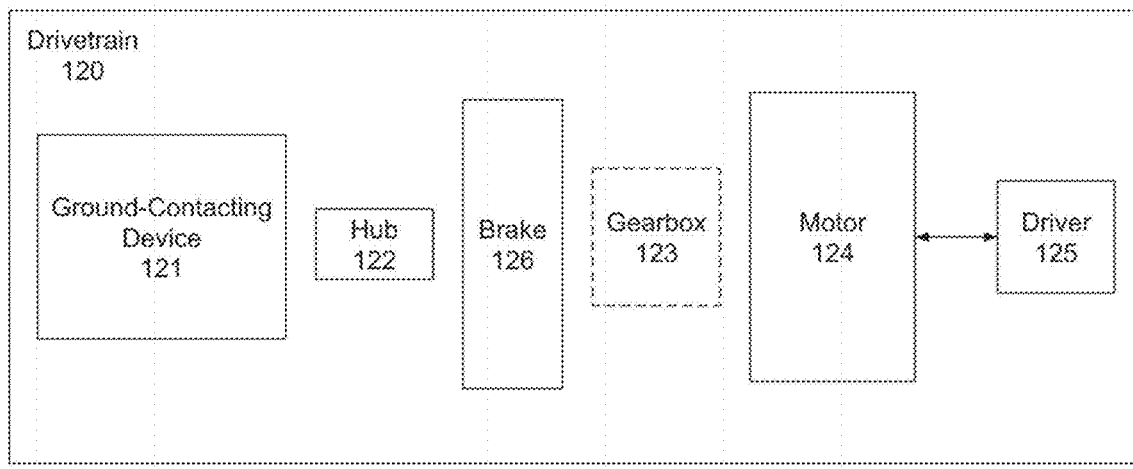
FIG. 2 is a block diagram of the drivetrain subsystem module of the embodiment of FIG. 1A.

Drivetrain 120 is illustrated schematically in more detail in FIG. 2. In an example embodiment, drivetrain 120 includes a motor 124, which, in some cases, may be an electrical motor, coupled through an optional gearbox 123 and a brake 126 to a hub 122 of a ground-contacting device 121 and controlled by a driver 125 (operatively coupled to computing unit 170 to receive operating instructions and/or provide operating parameter signals). In various embodiments, driver 125 is a computer software program configured to operate drivetrain 120. In some cases, however, driver 125 may also include a human operator located remotely from autonomous vehicle 100. It should be appreciated that in some instances, a human operator may be located within vehicle 100. The ground-contacting device 121 can have the form of a wheel or can include caterpillar tracks as an alternative. Brake 126 provides the capability of applying a braking force to ground-contacting device 121 (via hub 122) when desired to slow/stop vehicle 100 (and an aircraft being towed by vehicle 100, if applicable). Brake 126 may employ any suitable known mechanism for braking, such as a disc brake (disk clamped between brake pads driven by pistons on a caliper). In addition to, or in lieu of, a mechanical braking mechanism, the braking function may be provided by the resistance of motor 124 to the rotation when no power is being supplied to motor 124. In the case of an electrical motor 124, such braking may be regenerative braking, in which the motor 124 functions as a generator and returns electrical energy to the energy storage 180. Vehicle 100 may have a single wheel 121 and associated components, e.g., operating similar to a unicycle or two wheels 121. Of course, either of these implementations would be statically unstable systems that would require complex inertial sensors and control mechanisms. Preferably, vehicle 100 includes at least three wheels 121 to be statically stable, and may include four or more wheels to provide redundancy, more stability, more degrees of control freedom, etc. In some embodiments, drivetrain 120 includes a separate motor 124, optional gearbox 123, hub 122, and driver 125, i.e., the vehicle 100 can include three, four, or more of the systems shown schematically in FIG. 2. In other embodiments, more than one wheel 121, or all wheels, could be driven (through an intermediary drivetrain system) by a single gearbox, motor, and/or driver.

In various embodiments, brakes may be calibrated based on a partial weight of the aircraft supported by vehicle 100. For example, calibration of brakes may include a requirement that a braking distance (calculated for a maximum speed of vehicle 100) for vehicle 100 remains less than a target value (e.g., the braking distance is less than 1 meter, 2 meters, 3 meters, and the like) regardless of the partial weight of the aircraft supported by vehicle 100.

Figure 3:
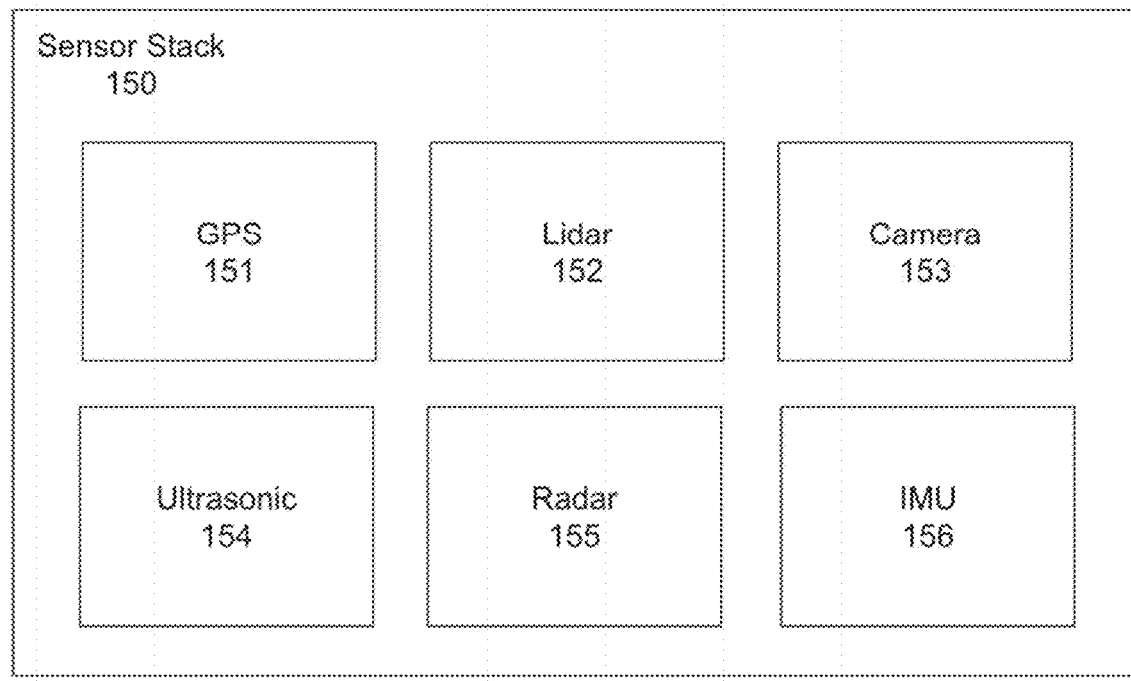
FIG. 3 is a block diagram of the perception sensor stack of the embodiment of FIG. 1A.

Sensor stack 150 is illustrated schematically in FIG. 3. Sensor stack 150 can include one or more sensors by which vehicle 100 can determine the location of the vehicle 100 in its environment, the location of the aircraft (and particularly the GCS of the aircraft) with which the vehicle is to engage and transport, and other aircraft, vehicles, persons and other objects, stationary or moving, in the environment. In this embodiment, sensor stack 150 can include multiple Lidar(s) 152, ultrasonic sensor(s) 154, radar(s) 155, camera(s) 153, inertial measurement unit(s) 156 and GPS 151 module(s) for geolocalization. Data streams from these sensors are fed to computing unit 170. Camera(s) 153 can be used with Lidar(s) 152, radar(s) 155, or ultrasonic range sensor(s) 154 to perform sensor fusion indiscriminately for perception.

Figure 4:
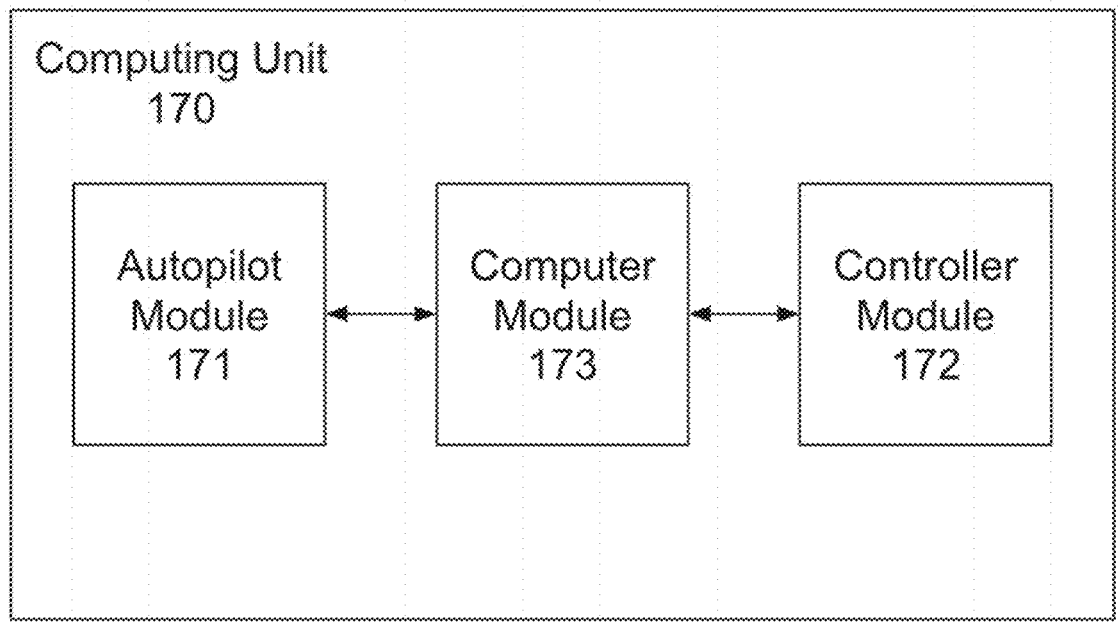
FIG. 4 is a block diagram of the onboard computing unit of the embodiment of FIG. 1A.

Computing unit 170 is illustrated schematically in more detail in FIG. 4. In this embodiment, computing unit 170 can include an autopilot module 171, a controller module 172, and a computer module 173. Computing unit 170 can receive inputs from and provide control instructions to the other components of the vehicle 100, and can include modules to perform various functions based on the inputs from other components and generate instructions to be provided to the other components. Autopilot module 171 can process all the data coming in from the sensors in sensor stack 150. Controller module 172 can send input commands to driver 125 in drivetrain 120 and computer module 173 can perform feedback computations from the autopilot module 171 and the controller module 172, in addition to the calculations from the rest of the modules in vehicle 100.

Figure 5:
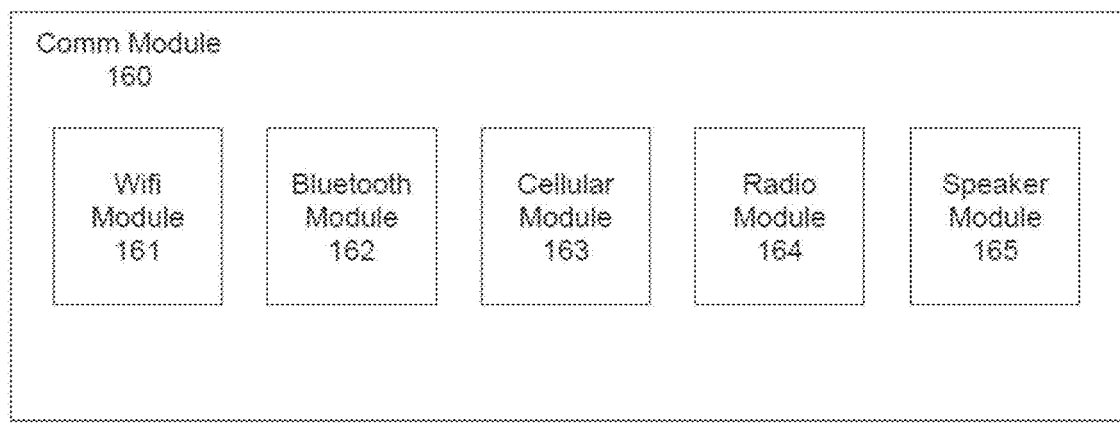
FIG. 5 is a block diagram of the communications (comm) module of the embodiment of FIG. 1A.

Comm module 160 is illustrated schematically in more detail in FIG. 5. In this embodiment, comm module 160 can include a WiFi module 161, Bluetooth module 162, cellular network module 163, radio module 164, and a speaker module 165. Comm module 160 can receive inputs from computing unit 170 and relay information back. This module is responsible for communicating vehicle 100 with other vehicles 100 and the base station cloud services.

Figure 6:
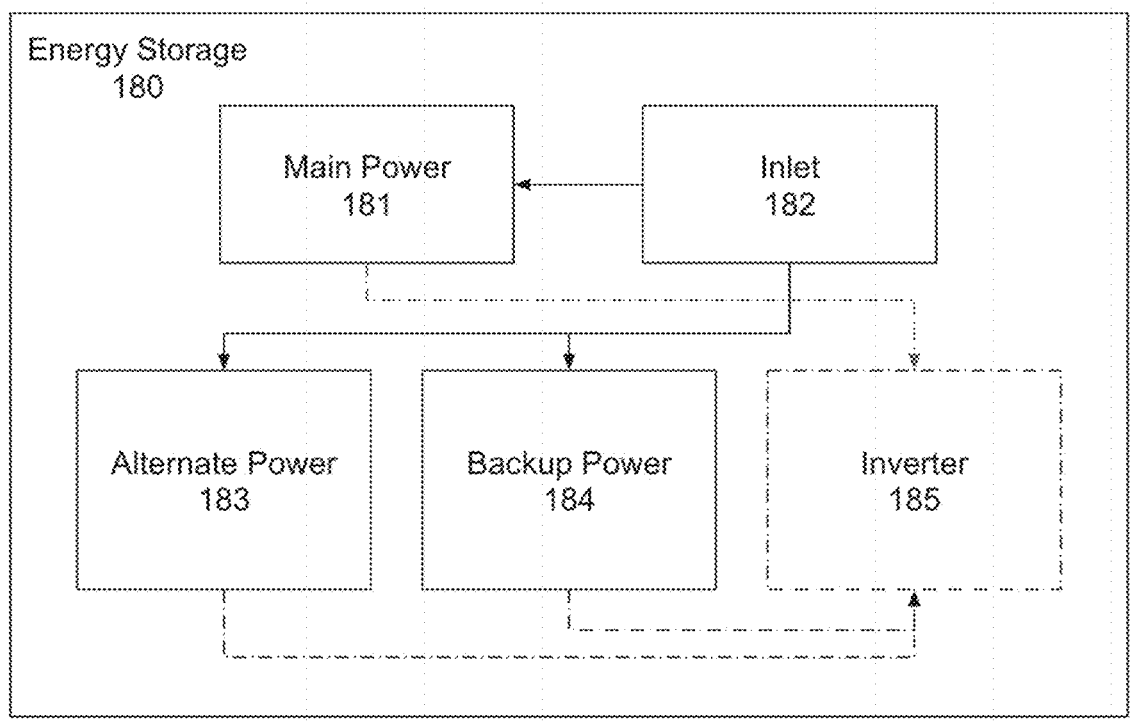
FIG. 6 is a block diagram of the energy storage module of the embodiment of FIG. 1A.

Energy storage 180 is illustrated schematically in FIG. 6. In this embodiment, energy storage 180 can include a main power unit 181, an alternate power unit 183, a backup power unit 184, an inlet 182, and an inverter 185. Power units 181, 183, and 184 can have the form of batteries. Inverter 185 is an optional block to be used when components in vehicle 100 require different current modalities such as AC or DC. Inlet 182 can also be called a charging port for dock charging or manual charging. Energy storage 180 can provide energy to the other components of vehicle 100 for the duration of the mission or operating cycle of vehicle 100 and can be replenished between missions or operating cycles from a suitable source at the aircraft facility in which vehicle 100 operates. It should be appreciated that any of the power units 181-184 are not restricted to batteries, and energy may be stored in any other suitable way. For example, energy may be stored in the form of a mechanical energy (e.g., compressed gas, rotating flywheel, and the like), or in the form of a chemical energy (e.g., using fuel such as hydrogen, alcohol, or hydrocarbon-based fuel). In some cases, power units 181-184 may provide only a small amount of energy storage and may be dynamically replenished via a distributed power supplying network, which may, for example, include ground-level power supply (e.g., power rails, contacted by vehicle 100).

Figure 7:
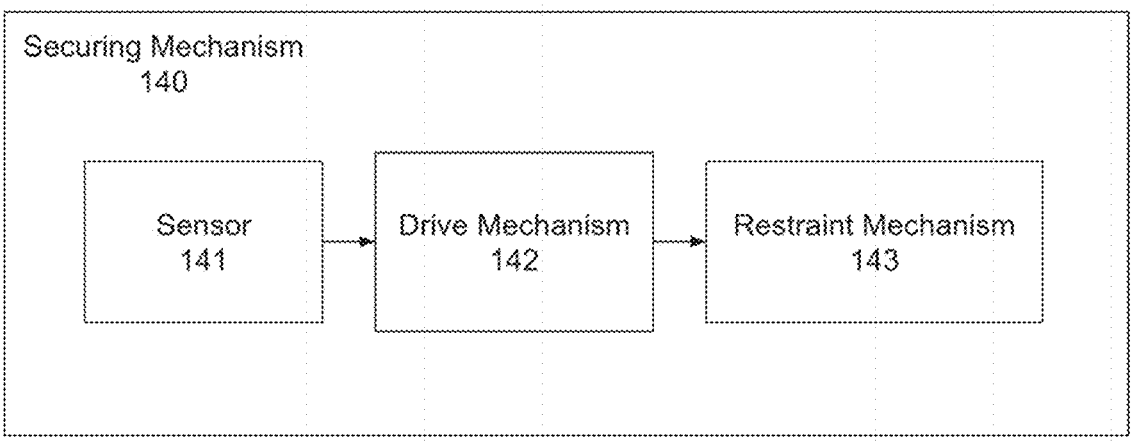
FIG. 7 is a block diagram of the securing mechanism of the embodiment of FIG. 1A.

Securing mechanism 140 is illustrated schematically in FIG. 7. Securing mechanism 140 is responsible for securing the GCS to vehicle 100 for the duration of taxi operations. In this embodiment, securing mechanism 140 can include a sensor 141 to detect GCS position and orientation when mounted on vehicle 100, a restraint mechanism 143 to engage the GCS, and a drive mechanism 142 to move the restraint between engaged and disengaged positions. One example of such securing mechanism 140 can consist of a sliding panel housed in the frame inside chassis 110, powered by a motor connected to a rack and pinion system, controlled by an ESC, and governed by a light gate (or any other type of sensor that indicates the presence of GCS) indicating the presence of an GCS. Any other suitable securing mechanism 140 may be employed for securing the GCS to vehicle 100 during a towing of an aircraft by vehicle 100. In various embodiments, securing mechanism 140 (or a plurality of securing mechanisms) are used to ensure that GCS does not disengage from vehicle 100. Examples of securing mechanism 140 are further described below.

Figure 8:
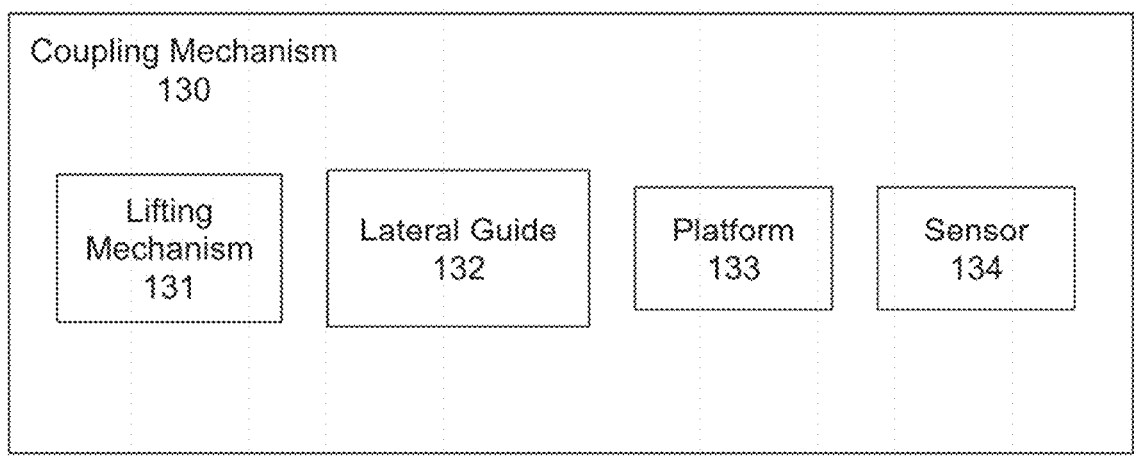
FIG. 8 is a block diagram of the coupling mechanism of the embodiment of FIG. 1A.

Coupling mechanism 130 is illustrated schematically in FIG. 8. Coupling mechanism 130 consists of a lifting mechanism 131 responsible for mounting the GCS onto vehicle 100, which, in some embodiments, can have the form of a ramp, a lateral guide 132, which can have the form of side rails, a platform 133 (herein, also referred to as a housing 133) where the GCS rests and a sensor 134 that detects the full insertion of the GCS in vehicle 100. One example of such coupling mechanism 130 can involve a central ramp that raises an incoming GCS, which is guided by the side rails. The GCS rolls up to the central platform, which has a pressure sensor at the back, and houses a track through which the restraint mechanism 143 moves to secure the GCS. Various other coupling mechanisms are described further below.

One exemplary embodiment of a vehicle is shown in FIGS. 9A to 9G. Vehicle 200 has a drivetrain 220 with four wheels 225, each with a corresponding electrical motor 222, optional gearbox 223, hub 224, and driver 226, positioned near the four corners of a rectangular, U-shaped chassis 210. Chassis 210 is generally bilaterally symmetrical, with a central channel 213 (herein, also referred to as platform 213) open at the front end 211, into which the aircraft GCS can be received. Coupling mechanism 130 is implemented in this embodiment as a shallow ramp 232 with a front edge 233 disposed close to ground G and a rear edge 234 adjacent to a platform 235 on which GCS can be supported in the transport position (in an example embodiment platform 235 may be the same as platform 213). Ramp 232 is bounded at its sides by raised rails 212 (see FIG. 9C) on the chassis 210. Rails 212 angle towards each other in the direction of platform 235, thus providing lateral guidance to urge GCS towards the center of platform 235. The aircraft GCS can be retained on platform 235 in the transport position by securing mechanism 140 (as previously discussed), which in this embodiment is embodied as a panel 242 (see FIG. 9C) that can be moved between a disengaged, open position and an engaged, closed position spanning the top of the ramp 232. Panel 242 can be moved between the open and closed positions by, for example, an electric drive motor 244 and a rack-and-pinion drive system 246 with a light gate sensor 248 to detect the entry of the GCS.

In an example embodiment, energy storage 280 is implemented as batteries, with a main battery 282, a backup battery 284, and an auxiliary battery 286. Inverter 285 is an optional block to be used when components in vehicle 200 require different current modalities such as AC or DC. Main battery 282 is sized to have a capacity sufficient to power the vehicle throughout a normal operating day, moving aircraft e.g., approximately every 90 seconds. The electrical motors 222 can be the primary consumers of electrical energy. Backup battery 284 can be engaged if the main battery 282 is running low, e.g., does not have sufficient charge remaining to complete a current utilization cycle and return to a charging station. Auxiliary battery 286 provides the necessary power to critical components (e.g., computing unit 270, comm module 260, sensor stack 250), in case the other batteries 282, 284 discharge. Batteries 282, 284, 286 can be recharged when vehicle 200 is not required to operate. External ports 288 provide an interface between the batteries and allow the vehicle 200 to recharge the batteries after each utilization cycle without replacement. The vehicle 200 is capable of recognizing its power state (e.g., by the computing unit 170 receiving information from the batteries on their remaining charge) and can autonomously navigate (under the control of the computing unit 270) to a charging station 289 and dock itself for charging, aligning ports 288 of the vehicle with other ports 290 in charging station 289, through an autonomous means of coupling using an array of sensors from Sensor Stack 250 in vehicle 200 and alignment sensor 291 in charging station 289. Alternatively, a human operator can manually charge the vehicle 200.

In an example embodiment, an operator (e.g., a suitable machine or a human operator) may be configured to remove one or more power supply units 282-286 from vehicle 200 and insert new charged respective power supply units 282-286. In an example embodiment, replacement (herein, also referred to as swapping) of power supply units 282-286 may be either automated or configured to be done efficiently by a human operator. For example, a power supply (e.g., power supply 282) may held in a suitable housing and connected to vehicle 200 via a suitable connection mechanism. The connection mechanism may electrically connect power supply 282 to an electrical circuit of vehicle 200, as well as secure the power supply 282 within the housing. In an example embodiment, the connection mechanism may be configured to quickly release power supply 282, allowing power supply 282 to be removed from the housing. A new charged power supply 282 may be inserted into the housing and the connection mechanism may be configured to reconnect with the charged power supply 282. Operations for swapping power supply 282 may be done by a human operator or may be done automatically by a suitable robotic arm or any other suitable device.

Vehicle 200 contains various sensors, which can include GPS module(s) 251, Lidar module(s) 252, and camera module(s) 253. In some cases, multiple camera modules 253 may be present. For example, four camera modules 253 may be mounted above rear face 236. Two cameras face the rear 215 of the vehicle and another two face the front 211 of the vehicle, providing panoramic displays forward and aft of the vehicle. In an example embodiment, cameras may be mounted at different heights above chassis 210 of vehicle 200. For example, at least one camera may be mounted high above vehicle 200.

In some cases, multiple Lidar modules 252 may be present. For example, four lidar modules 252 may be positioned at each of the four corners of chassis 210 and lie on the same plane as face 216. They provide four unique coverage points for navigating obstacles that may surround the vehicle. One GPS module 251 is directly mounted on face 216 and aligned with the centerline of the vehicle.

Figure 10A:
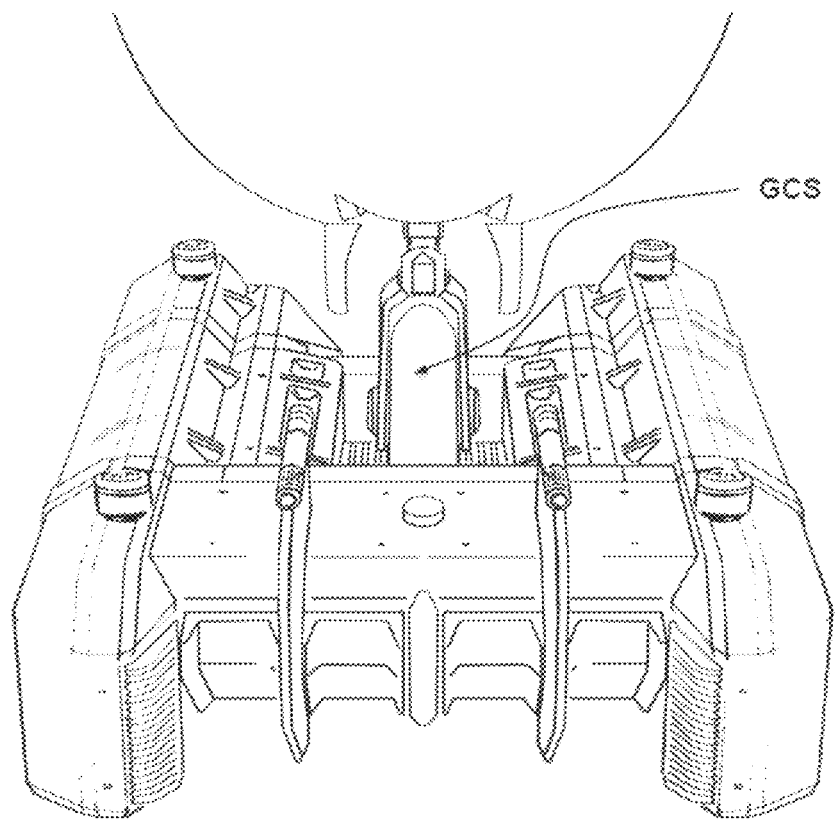
FIGS. 10A to 10C are rear perspective, side perspective, and front perspective views, respectively, of the vehicle of FIGS. 9A to 9D with a ground contacting structure of an aircraft supported on the vehicle.
Figure 10B:
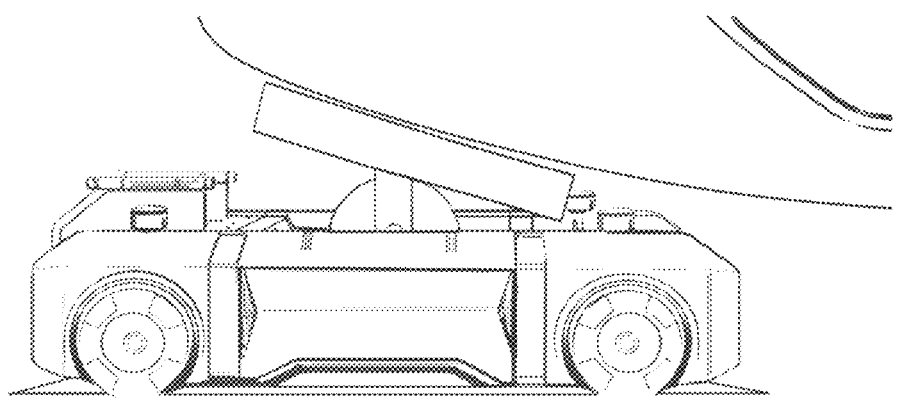
Figure 10C:
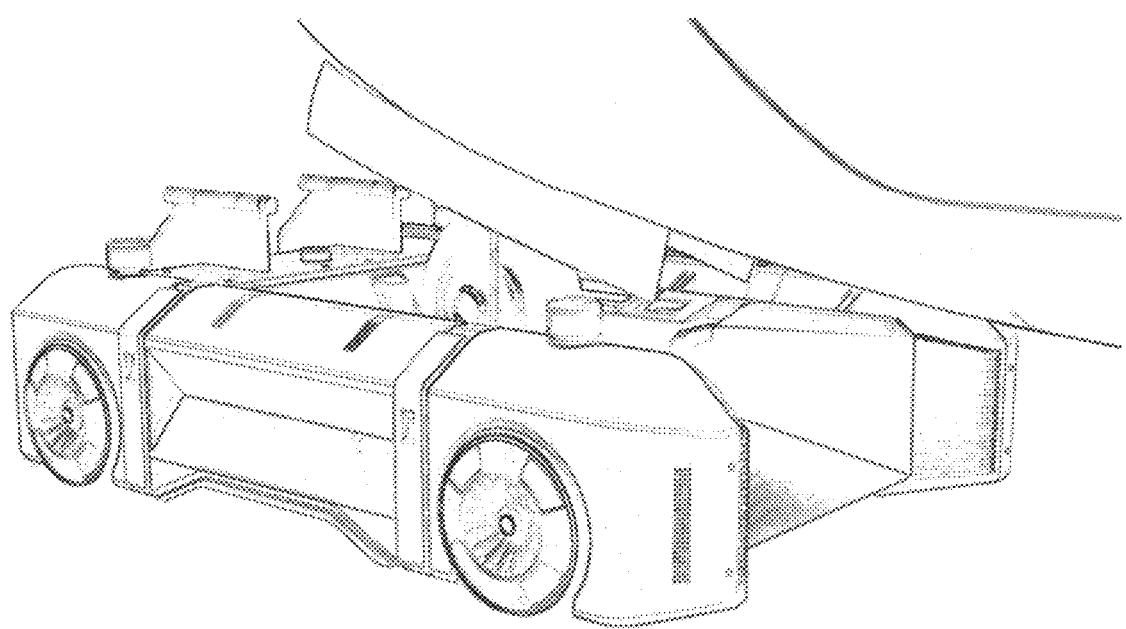

As shown in FIGS. 10A to 10C, the GCS of an aircraft (only a portion of which is visible in the figures) can be positioned in the transport location on platform 235, with panel 242 disposed in its closed position, preventing GCS from being dislodged from platform 235 during movement of vehicle 200 and the aircraft. To load the aircraft GCS into vehicle 200, vehicle 200 may be autonomously navigated towards the aircraft, near the GCS. As described in more detail in the Software section below, the GCS can be detected and more precisely located by the computing unit 270 based on data from sensor stack 250, and vehicle 200 maneuvered relative to GCS until front edge 233 of ramp 232 is brought into engagement with the GCS. The panel 242 is disposed in its open position. With the brakes engaged on the main landing gear of the aircraft, and no braking force applied to the GCS (so that it can rotate freely), vehicle 200 can then be driven forward so that ramp is driven under GCS, until the GCS crosses the rear edge 234 of ramp 232, and the location of the open panel 242, until the GCS is received on platform 235. Upon confirmation that GCS is properly disposed of on platform 235 in the transport position, panel 242 can be moved to its closed position, thus securing the GCS on the platform 235. Vehicle 200 can then initiate transport of the aircraft to reposition it to the desired location on the aircraft facility.

Other possible implementations of the coupling mechanism 130 will now be described with reference to FIGS. 11A to 23F.

Figure 11A:
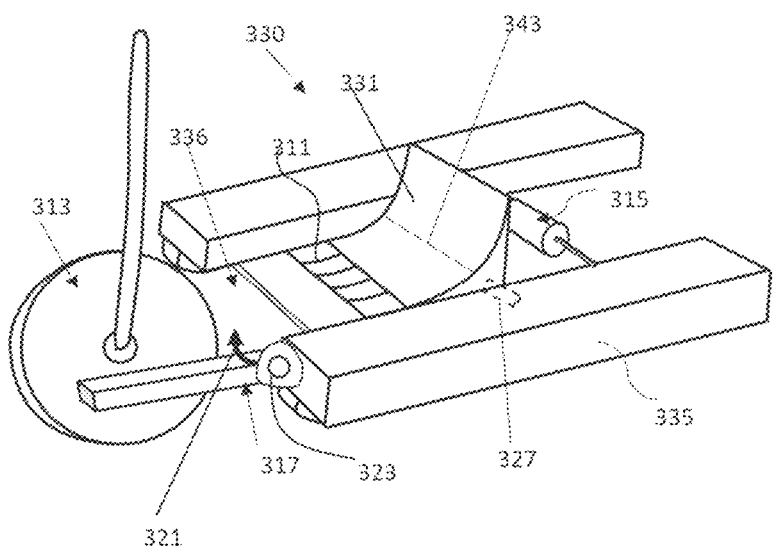
FIG. 11A is a perspective view of a coupling mechanism for a vehicle, according to an embodiment
Figure 11B:
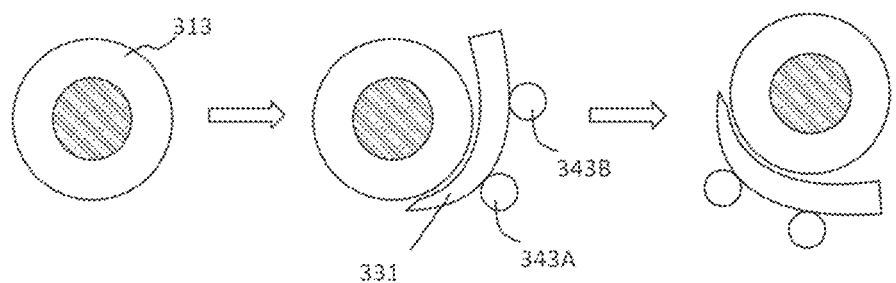
FIGS. 11B-11D are schematic side and top views, respectively, showing a sequence of operation by which the coupling mechanism of FIG. 11A engages and lifts an aircraft GCS.
Figures 11C, 11D:
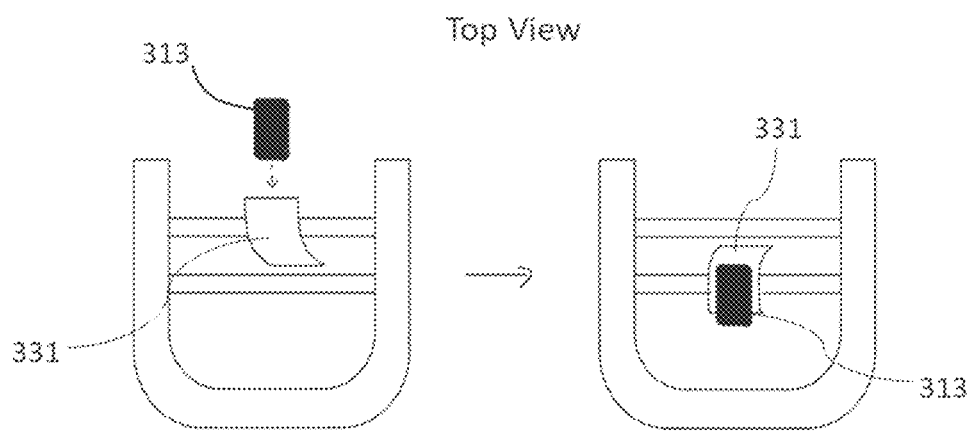
Figure 12A:
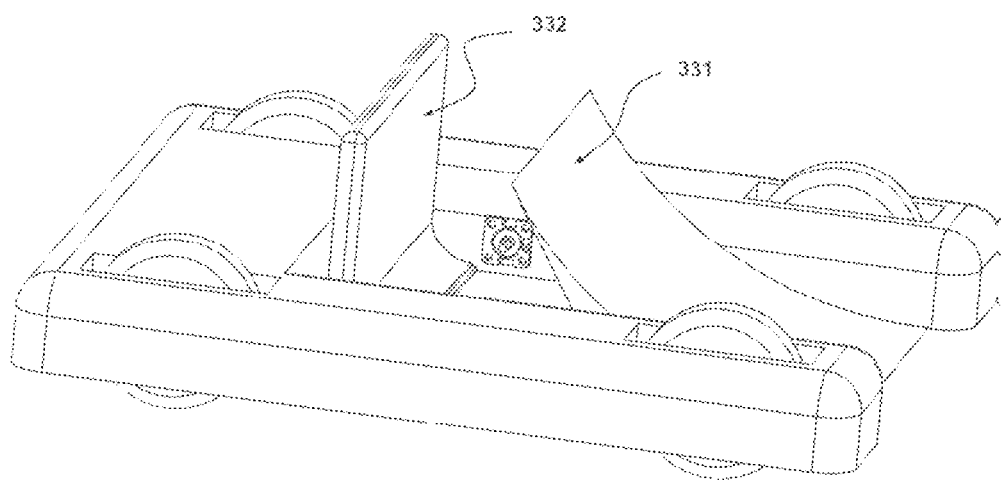
FIGS. 12A and 12B are perspective views of the coupling mechanism according to the embodiment in FIGS. 11A to 11D.
Figure 12B:
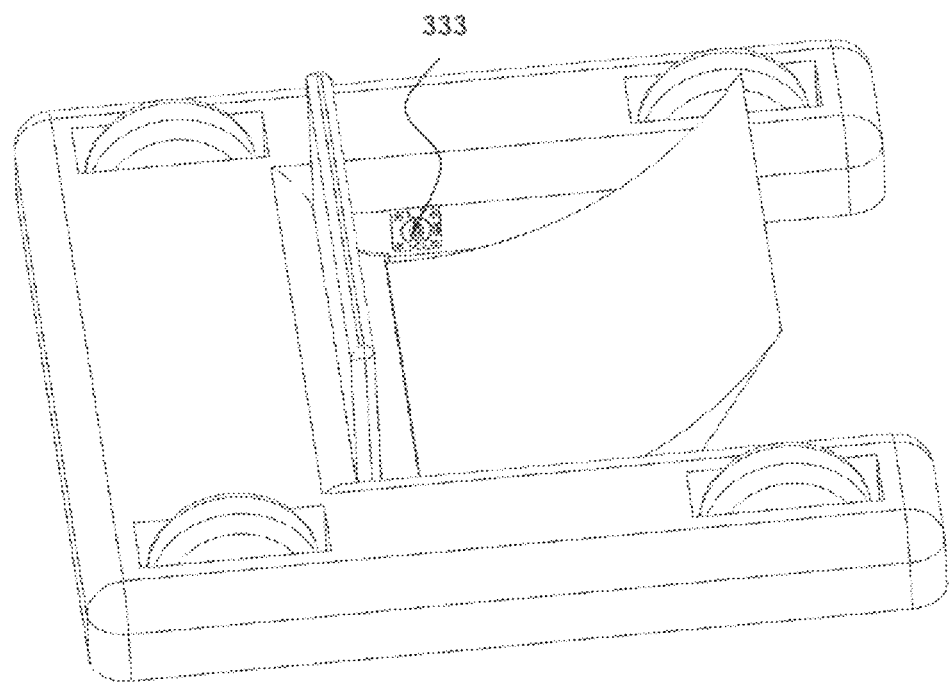

FIGS. 11A to 11D show coupling mechanism 330 using a see-saw embodiment. FIGS. 12A and 12B depict coupling mechanism 330 of FIGS. 11A to 11D in perspective views. An incoming GCS rolls into a curved ramp 331, which is hinged and free to pivot around a central pin 327. In an example embodiment, ramp 331 may include pressure sensors 311. The ramp is configured to pivot (i.e., rotate about central pin 327) once a GCS (e.g., a wheel 313) rolls past neutral points (e.g., neutral points may be shown by line 343) and exerts a moment on the hinged ramp, as shown in FIG. 11B. In some cases, central pin 327 may be secured in place (e.g., as shown in FIG. 11A), and in other cases, as shown in FIG. 11B, another embodiment of a central pin (central pin 343A) may be used, which may be movable. In an example embodiment, ramp 331 may include another pin 343B for facilitating rotation of ramp 331 and for supporting wheel 313. In various embodiments, wheel 313 is secured by the now-pivoted ramp and a stopping panel 332 on the opposite side. Alternatively, a safety latch 333 can be used to secure the hinged ramp in transport position, as shown in FIGS. 12A and 12B. FIGS. 11C and 11D show a top view of wheel 313 moving over ramp 331. Returning to FIG. 11A, ramp 331 is configured to be in the proximity of chassis 335 (e.g., ramp 331 may be connected to chassis 335 via central pin 327). An entrance 336 to ramp 331 may be opened or closed by a gate member 317 rotating around a hinge 323 in a direction, as shown by arrow 321. For example, gate member 317 may be opened when ramp 331 is receiving wheel 313 and may be closed after ramp 331 is pivoted around central pin 327. FIG. 11A also shows a motor 315 which may be used for operation of coupling mechanism 330 (e.g., motor 315 may be used for operating gate member 317).

Figure 13A:
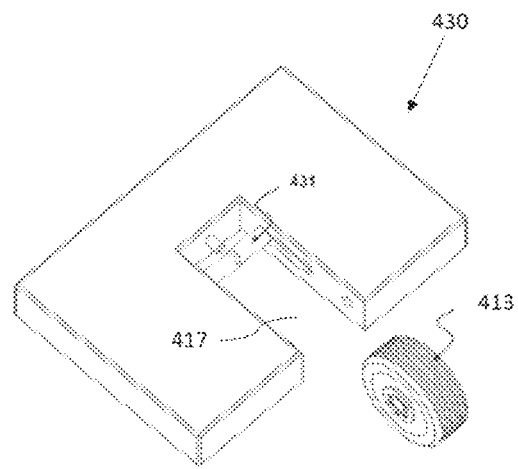
FIGS. 13A to 13C are perspective views of a coupling mechanism according to an embodiment.
Figure 13B:
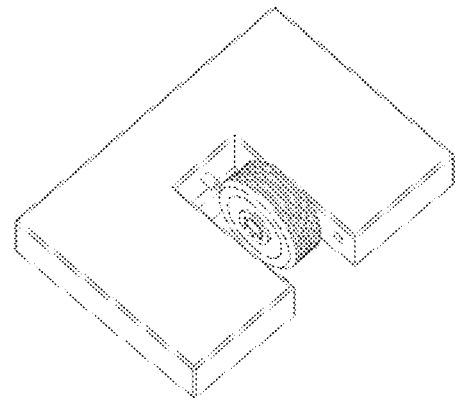
Figure 13C:
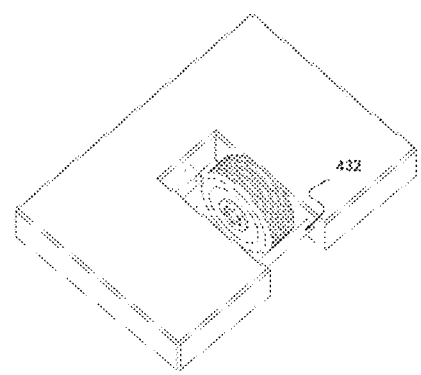

FIGS. 13A to 13C show a coupling mechanism 430, which uses a sliding bar embodiment in perspective views. An incoming GCS 413 enters a cavity 417, and is stopped by a cylinder 431 and is secured in the rear by a sliding bar 432. GCS 413 is restrained by 431 and 432 for the duration of taxi operations.

Figure 14A:
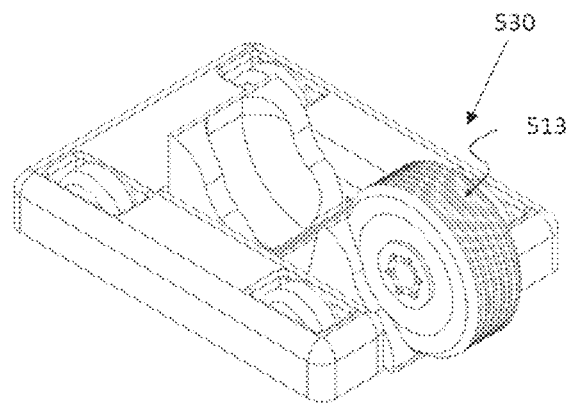
FIGS. 14A to 14C are schematic views of a coupling mechanism according to an embodiment.
Figure 14B:
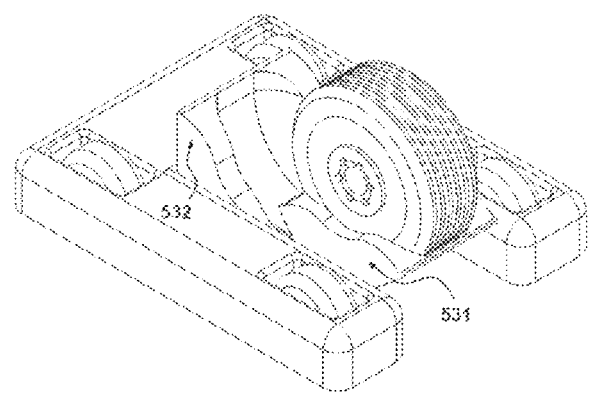
Figure 14C:
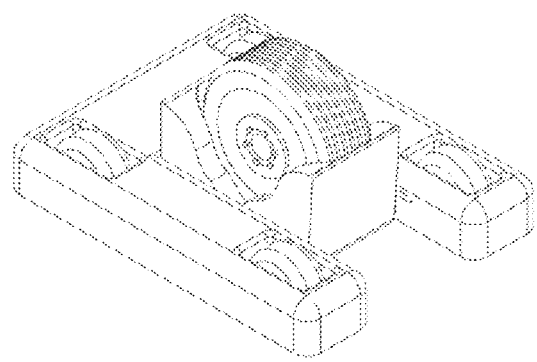

FIGS. 14A to 14C show a coupling mechanism 530, which uses a dual see-saw embodiment in perspective views. An incoming GCS 513 rolls into a see-saw ramp 531 that has two hinges, reducing net loading on each hinge pin. As GCS 513 rolls the ramp closes on itself housing one end of GCS 513. An identical, second curved ramp 532 is opposite to the first and dually couples to secure GCS 513.

Figure 15:
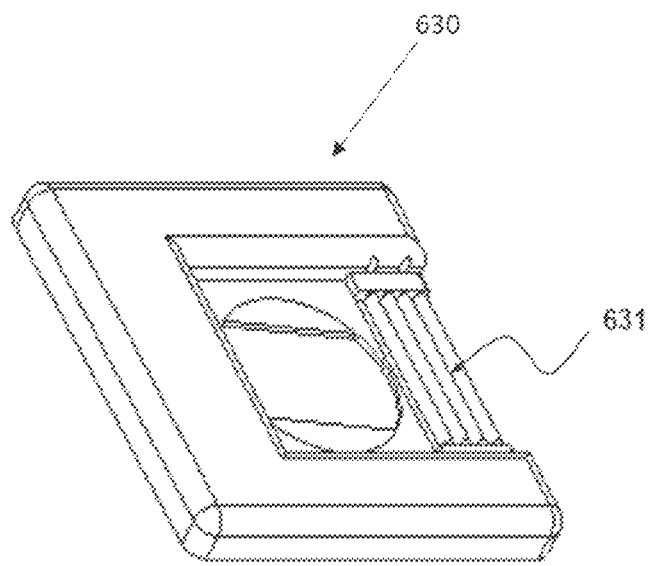
FIG. 15 is a perspective of a coupling mechanism according to an embodiment.

FIG. 15 shows coupling mechanism 630, which uses a roller embodiment in a perspective view. An incoming GCS is configured to roll into the central platform with an assistance of a series of free-rolling cylinders 631, which are then raised to secure the GCS.

Figure 16A:
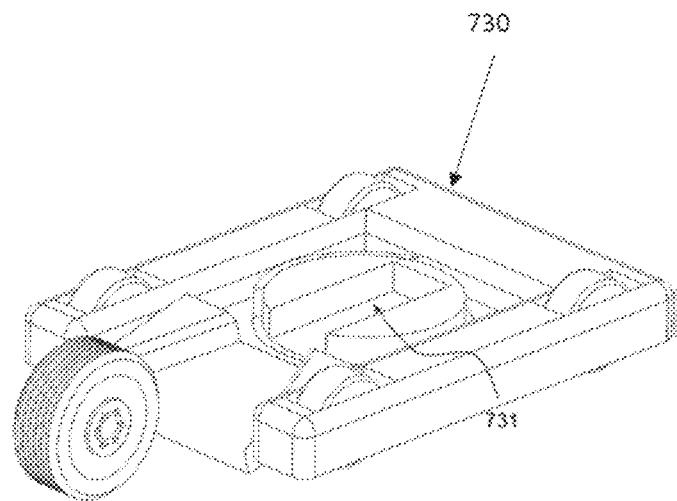
FIGS. 16A to 16C are perspective views of a coupling mechanism according to an embodiment, showing a sequence of engagements with an aircraft GCS.
Figure 16B:
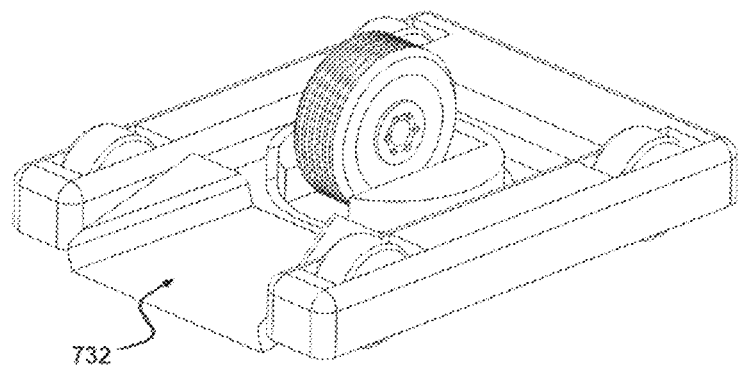
Figure 16C:
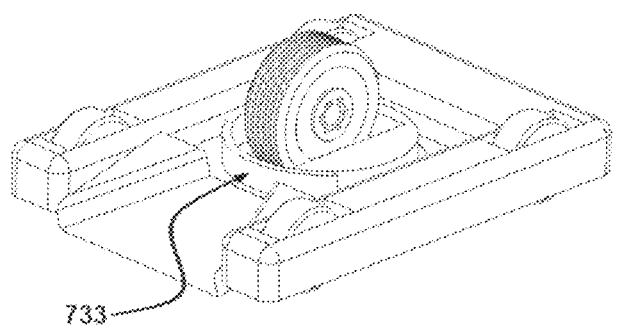

FIGS. 16A to 16C show coupling mechanism 730, which uses a rotating mechanism embodiment in perspective views. An incoming GCS is guided onto a platform 731 via a shallow ramp 732. Once loaded onto the platform 731, a rotary panel 733 rotates to secure the rear end of the wheel.

Figure 17A:
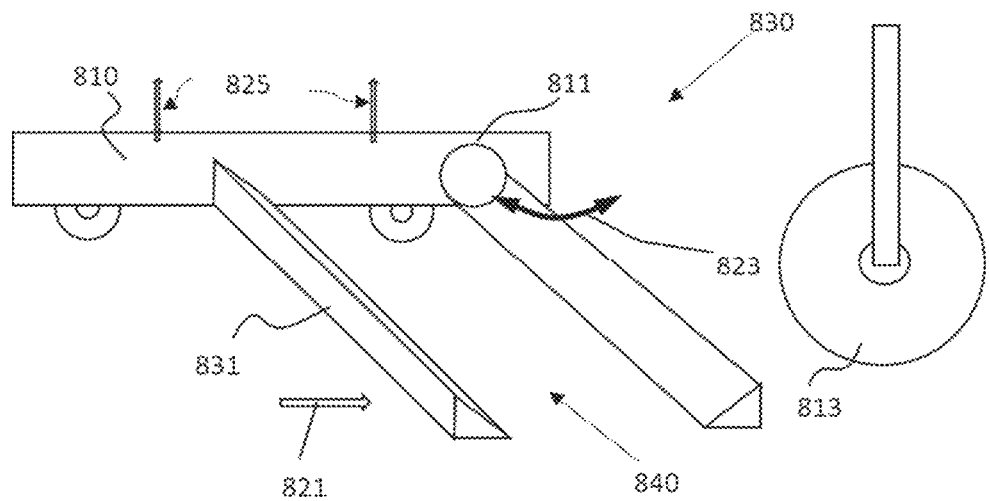
FIGS. 17A and 17B are perspective views of a coupling mechanism according to an embodiment.
Figure 17B:
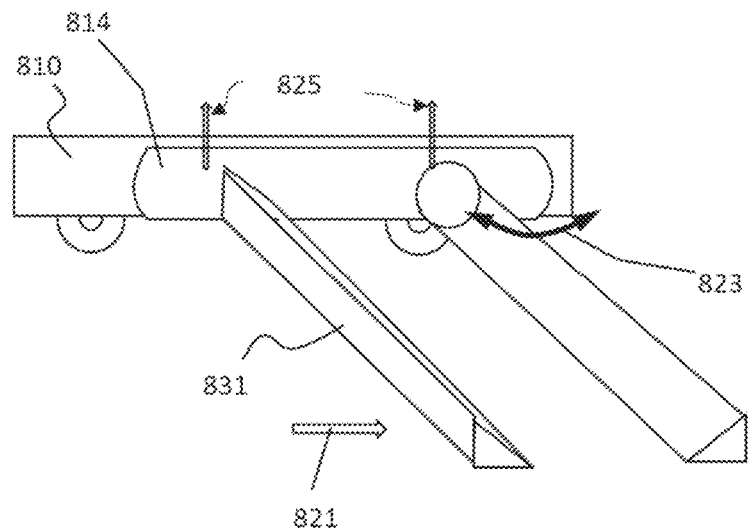

FIGS. 17A and 17B show coupling mechanism 830, which uses a lifting arms-lifting chassis embodiment, depicted in drawings. An incoming GCS 813 is configured to be stopped by a first arm 831. A second arm 832 may be opened to allow GCS 813 to reach first arm 831, and may be closed from behind GCS 813, capturing the GCS completely within region 840 between arms 831 and 832. After capturing GCS 813 in region 840 and contacting GCS 813, both arms 831 and 832 can be lifted via any suitable mechanism for lifting the GCS off the ground. In an example embodiment, a mechanism 814, as shown in FIG. 17B, may be used to lift GCS 813 by lifting arms 831 and 832. In some cases, mechanism 814 is attached to chassis 810. Alternatively, the entire chassis 810 can lift itself (as shown by arrows 825 in FIG. 17A), achieving the same end result. In an example embodiment, as shown in FIG. 17A, arm 831 may be moved towards the GCS in a direction of an arrow 821, and arm 832 may be opened or closed as indicated by arrow 823. Once arm 832 is closed, it is configured to lock GCS 813 within region 840 and maintain horizontal and vertical stability of GCS 813. Arm 832 may be attached to chassis 810 via a suitable hinge 811 configured to allow arm 832 to open and closed as shown by arrow 823. In various embodiments, position of GCS 813 is determined by suitable sensors of an autonomous vehicle (e.g., sensors may be adjacent to arms 831 and 832, being part of arms 831 and 832, being installed in chassis 810, and the like). A control system associated with an autonomous vehicle may control any aspects of operation of coupling mechanism 830 such as, for example, operations of arms 831 and 832.

Figure 18A:
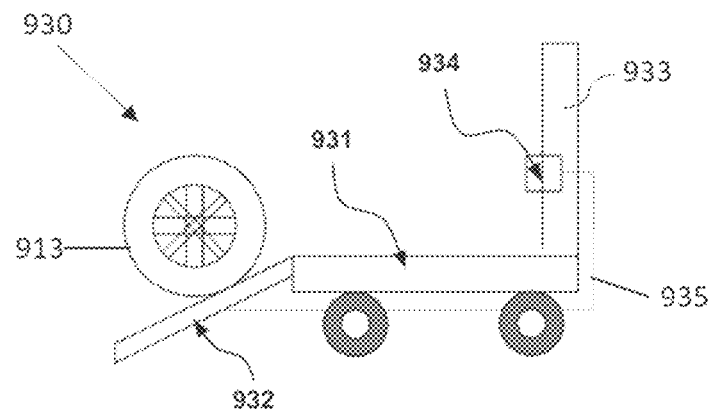
FIGS. 18A to 18C are schematic illustrations of a coupling mechanism according to an embodiment.
Figure 18B:
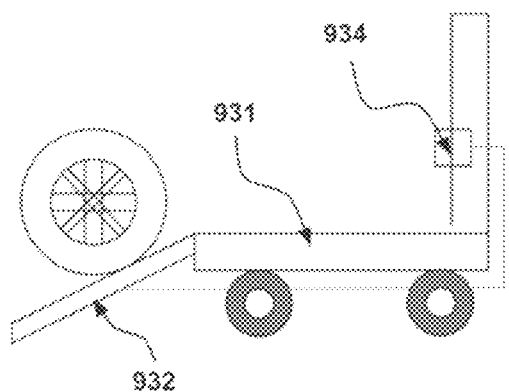
Figure 18C:
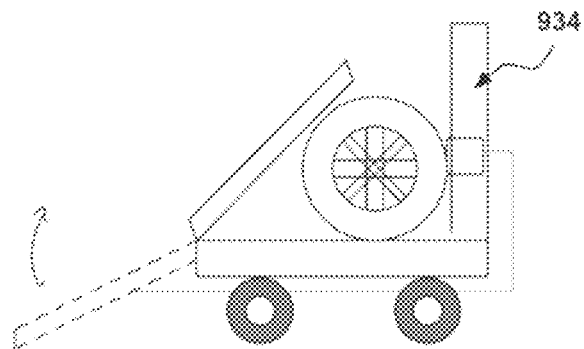

FIGS. 18A-18C show a coupling mechanism 930, which uses a tensioned wire 935. An incoming GCS 913 is guided onto a loading platform 931 via a ramp 932 and has a stopper panel 933 with an embedded switch 934 that activates upon contact with the wheel. Once activated, a tensioned wire 935 stows the ramp onto the rear face of the wheel, thus securing it.

Figure 19A:
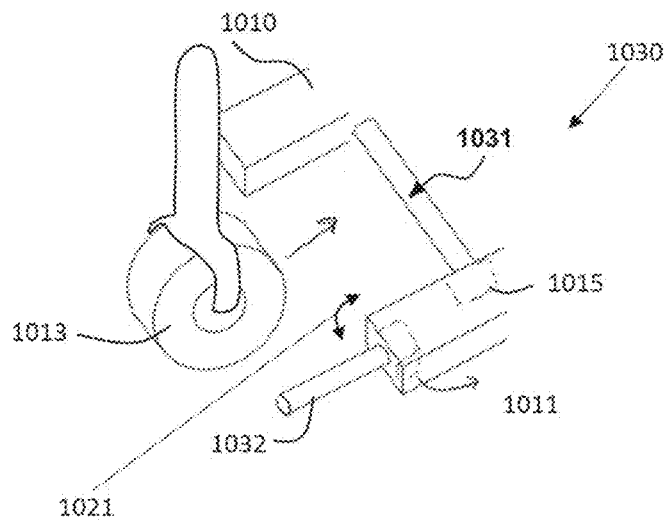
FIGS. 19A to 19C are schematic illustrations of a coupling mechanism according to an embodiment.
Figure 19B:
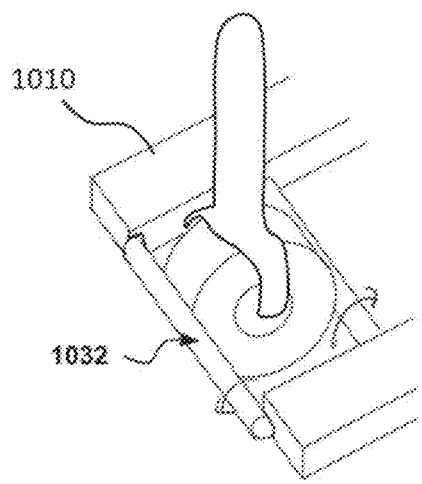
Figure 19C:
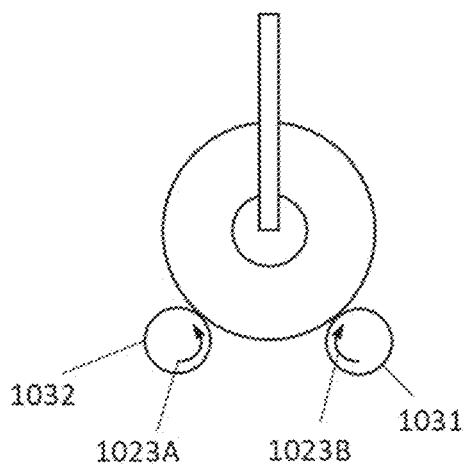

FIGS. 19A to 19C show a coupling mechanism 1030, which uses a folding cylinder embodiment in a schematic illustration. An incoming GCS 1013 is stopped by a first cylinder 1031. A second cylinder 1032 closes from behind, capturing the GCS completely. Both cylinders are configured to rotate in opposite directions. In an example embodiment, cylinder 1032 is configured to open and close as indicated by arrow 1021. Further, one or both cylinders 1031 and 1032 may be configured to rotate as shown, for example by arrows 1023A and 1023B. Rotation of cylinders 1031 and 1032 may be facilitated by suitable motors 1011 and 1015. Further, motor 1011 (or another motor) may also be configured to open and close cylinder 1032. Additionally, in some cases, cylinders 1031 and 1032 may be configured to be moved towards (or away) from each other, thus resulting in a vertical motion of GCS 1013. For example, when cylinder 1031 is configured to move towards 1032, CGS 1013 may be further lifted above the ground over which an autonomous vehicle is moving.

Figure 20A:
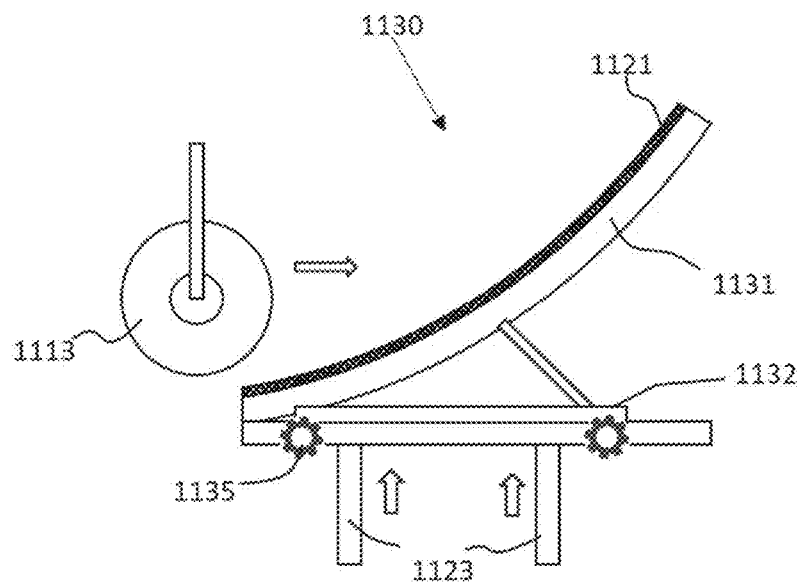
FIGS. 20A and 20B are schematic illustrations of a coupling mechanism according to an embodiment.
Figure 20B:
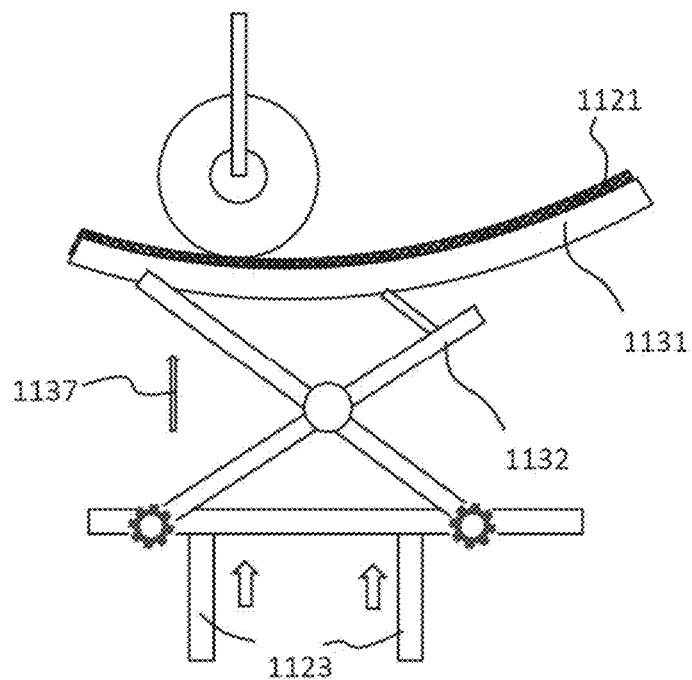

FIGS. 20A to 20B show a coupling mechanism 1130, which uses a hydraulic scissor lift 1132 in a schematic illustration. An incoming GCS 1113 may be loaded onto a platform 1131 that may be raised using scissor mechanism 1132 with hydraulics and gears 1135 to lift the wheel off the ground as shown by arrow 1137. In an example embodiment, a receiving end of platform 1131 may be close to the ground on which GCS 1113 is resting. After platform 1131 lifts, the GCS may be secured on platform 1131 via any suitable securing mechanism 140 for the duration of aircraft towing operation (in an example embodiment, the securing mechanism 140 may be a panel 242 as shown in FIG. 9C). In some cases, platform 1131 may include a pressure sensor 1121 for determining a position of GCS 1113 on platform 1131.

Figure 21A:
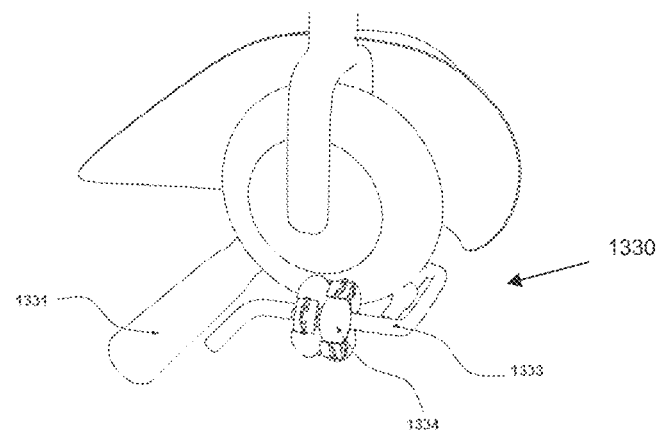
FIGS. 21A to 21C are schematic illustrations of a coupling mechanism including omnidirectional rollers according to an embodiment.
Figure 21B:
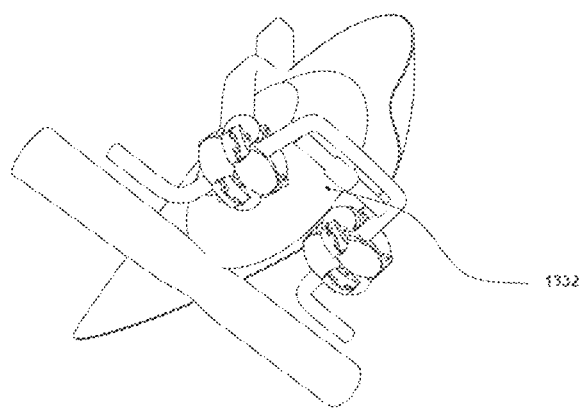
Figure 21C:
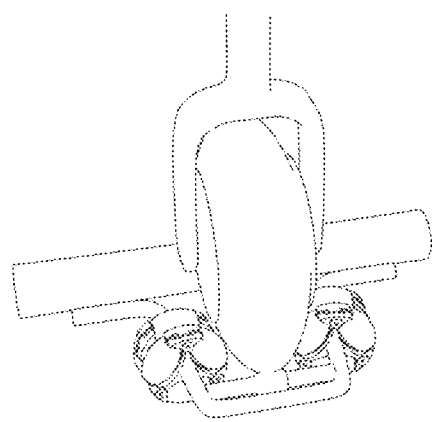

FIGS. 21A to 21C show a coupling mechanism 1330, which uses a linearly actuated y-bracket and single actuated roller embodiment in a schematic illustration. An incoming GCS rolls onto an initial hourglass roller 1331 to enter the platform loading area 1332. A y-bracket 1333 featuring omni-directional wheels 1334, distributed across the bracket frame to permit ease of GCS passage and increase lateral contact surface area, is fixed at the front of the platform loading area. The y-bracket 1333 is linearly actuated towards the GCS along the forward direction, where both 1331 and 1333 contact devices work in tandem to couple and lift the GCS off the ground. After the GCS is lifted, both contact devices are fixed in position, where the rear roller acts as a stopper and counteracts GCS rotation for the duration of the operation.

Figure 22A:
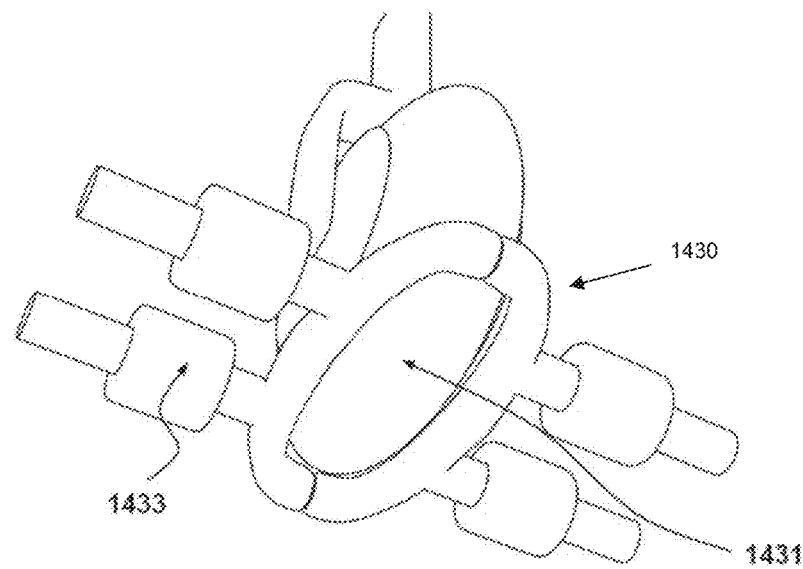
FIGS. 22A and 22B are other schematic illustrations of a coupling mechanism including rollers according to an embodiment.
Figure 22B:
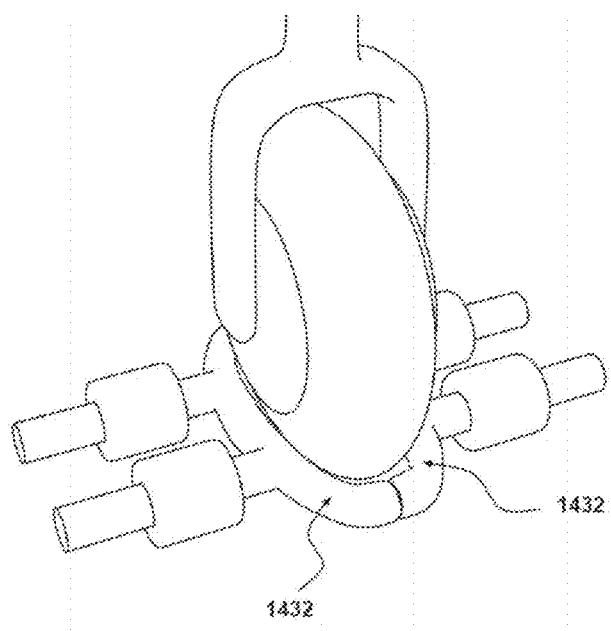
Figure 23A:
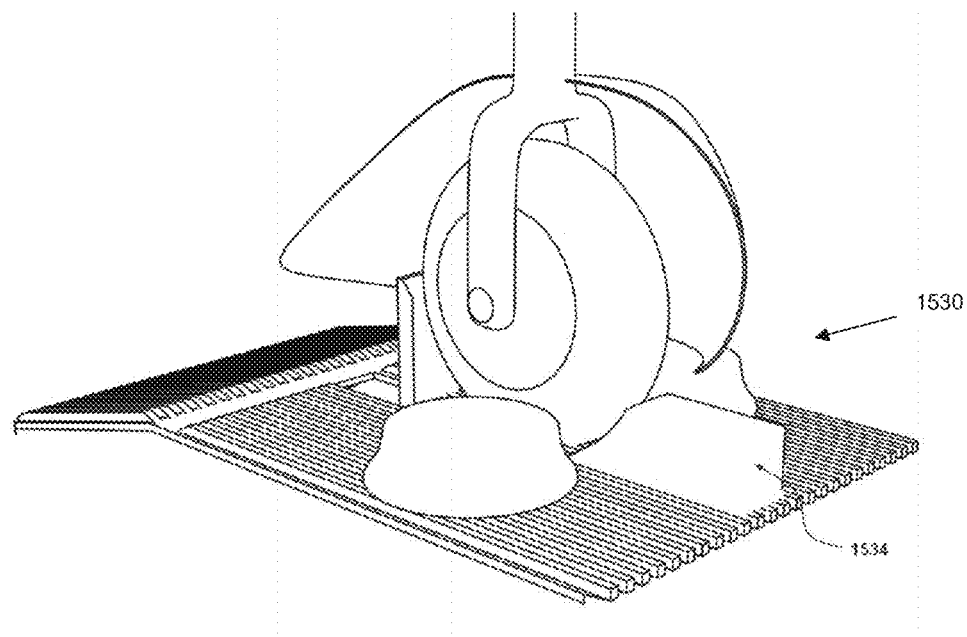
FIGS. 23A to 23F are other schematic illustrations of coupling mechanisms according to an embodiment.
Figure 23B:
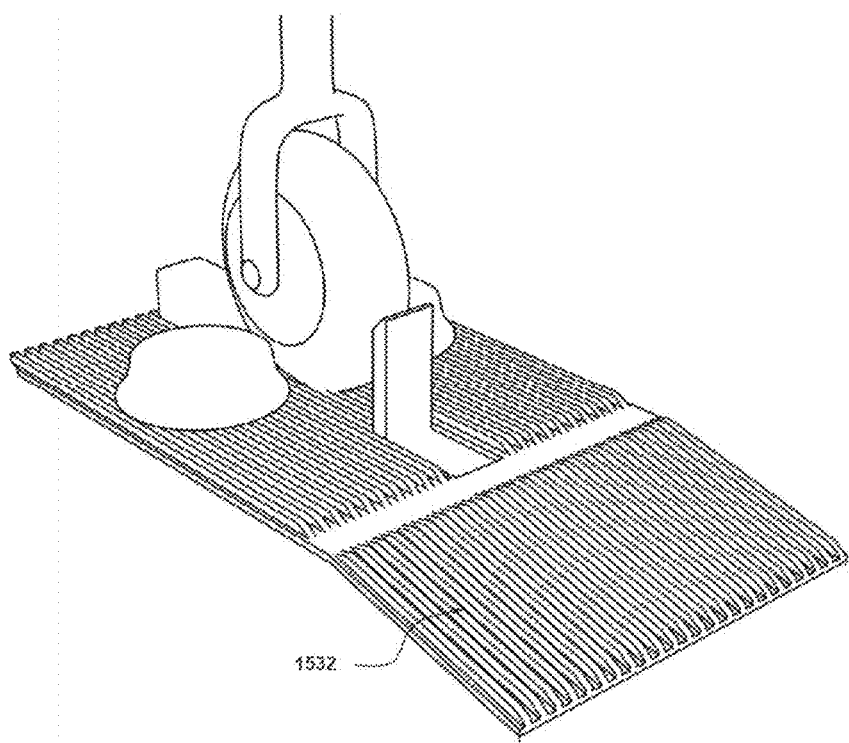
Figure 23C:
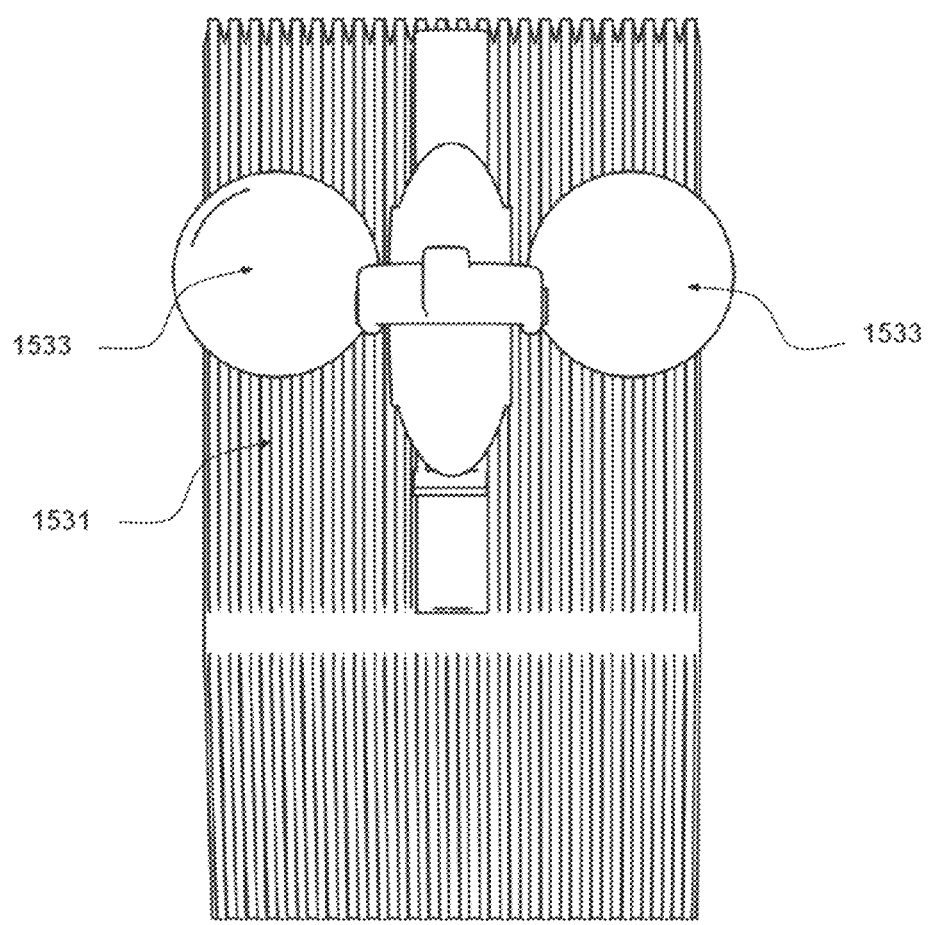
Figure 23D:
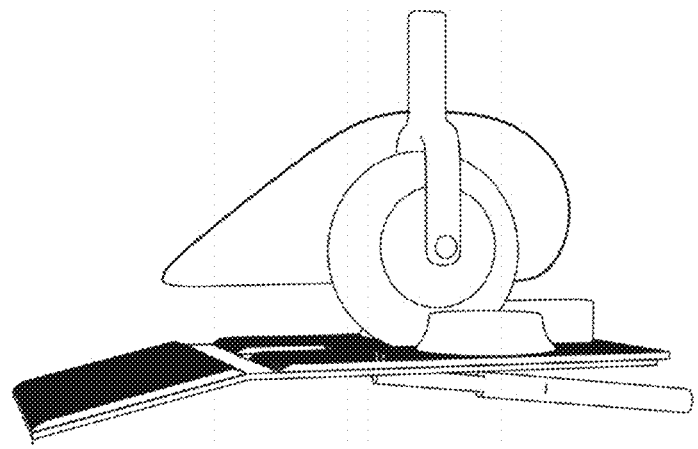
Figure 23E:
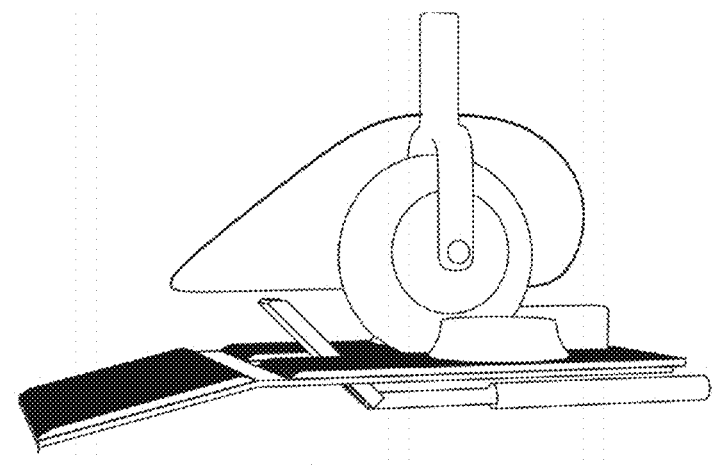
Figure 23F:
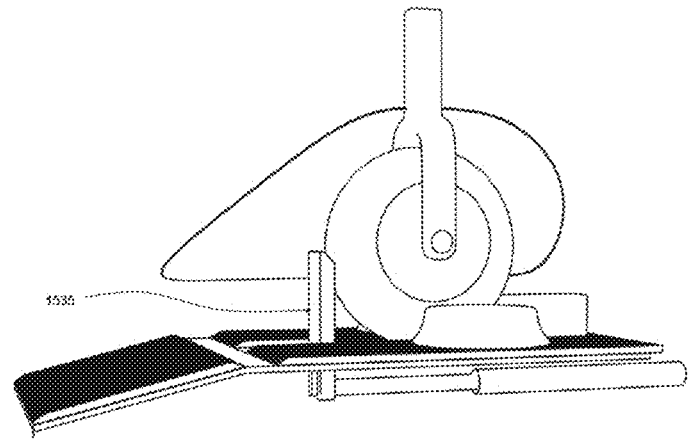

FIGS. 22A and 22B show a coupling mechanism 1430, which uses an oval-shaped receptacle embodiment in a schematic illustration. An incoming GCS enters the platform loading area 1431. A laterally-actuated, oval-shaped clamp 1432 encloses the GCS from the sides of the platform loading area. The clamps direct the GCS upwards upon clamping operation, suspending it above the ground for the duration of the operation. Bearings 1433 are distributed across the lateral structure of the oval receptacle and roll in contact with the ground during vehicle travel. This transfers aircraft loads directly to the ground and thus reduces bending moments on the oval structure.

FIGS. 23A to 23F show coupling mechanism 1530 using an inclined ramp, adjustable side rollers & front bumper, actuated securing panel embodiment in a schematic illustration. An incoming GCS enters the platform loading area 1531 and is guided up the inclined ramp 1532 by lateral rollers 1533. A front stopper 1534 stops and secures the GCS along the forward direction of the inclined ramp. A rear panel 1535 is actuated from behind the ramp platform to clamp the GCS through a presumed aircraft fairing cavity, and acts as a stopper for the duration of the operation. Once the operation is complete and the vehicle is ready to decouple the aircraft, rear panel 1535 is actuated back to its rest position to allow the GCS to come out.

Software

Some embodiments described herein relate to the autonomous navigation capabilities of the vehicle, alluding to the software aspects previously mentioned. The vehicle can perform various navigational tasks, operating between at least its base station and target dispatch locations. The software may include a first set of instructions performed by a control system associated with an aircraft facility (herein referred to as a base station (BAS)), and a second set of instructions performed by a control system associated with an autonomous vehicle (CSAV) configured to tow an aircraft at the aircraft facility. In various embodiments, the instructions performed by BAS and CSAV can be broken down into the following operations or phases:

During a first phase (phase 1), an aircraft lands, and a control system associated with an aircraft facility (BAS) receives information related to the aircraft. The base station receives relevant information about the landed aircraft (e.g., the relevant information may include a position of the aircraft, an orientation of the aircraft, a type of the aircraft, a type of a ground contacting structure for the aircraft, and the like). The relevant information is transmitted to an autonomous vehicle available for dispatch to tow the aircraft.

During a second phase (phase 2), the base station is configured to direct the autonomous vehicle to the ground contacting structure of the aircraft. In various embodiments, during deployment of the autonomous vehicle, the CSAV is configured to perform positioning-related operations such as trajectory correction and centimeter-level accuracy following of the trajectory using various location determining sensors (e.g., GPS, cameras, NFC communication, and the like). For example, NFC communication may be used with local beacons located in the vicinity of a path of the autonomous vehicle to further determine the location of the autonomous vehicle. In various embodiments, data from different sensors may be combined (or used independently) for error-tolerant navigation (e.g., data may be processed in any suitable way, such as filtered, averaged, and the like, to reduce errors associated with the data acquisition). In various embodiments, the CSAV is configured to perform operations related to collision avoidance while the autonomous vehicle is in transit to the aircraft (e.g., the CSAV of the autonomous vehicle is configured to avoid other autonomous vehicles, various aircrafts located at FATO pads and parking spaces, or any other objects (e.g., walls, equipment, charging stations, human operators, and the like)). In various embodiments, the autonomous vehicle is configured to operate in multiple detection modes. For example, the autonomous vehicle may use a Lidar 360-degree mode and an ultrasonic 180-degree mode. Additionally, or alternatively, the autonomous vehicle may use cameras, lasers, photodiodes, and the like, for detecting various objects.

In various embodiments, CSAV is configured to perform operations for precision alignment with a ground contacting structure of an aircraft. In various embodiments, CSAV may process information from various sensors available to the autonomous vehicle, such as a laser meter, (e.g., ToF sensors), cameras, and the like. CSAV may combine the image data obtained by the cameras with data from other sensors to perform precision alignment (e.g., computer vision (CV) algorithms such as, for example, object identification may be used by CSAV to perform (or improve) the alignment process). In an example embodiment, a sensor fusion of various sensors (e.g., cameras, radars, lidars, ultrasonic devices, and the like) may be used for CV algorithms to perform the precision alignment. In some cases, at least some of the data obtained by the sensors of the autonomous vehicle is transmitted to the bases station (e.g., such data may be used by other autonomous vehicles, or, in some cases, the base can assist with CV and improved alignment of the autonomous vehicle).

Figure 24:
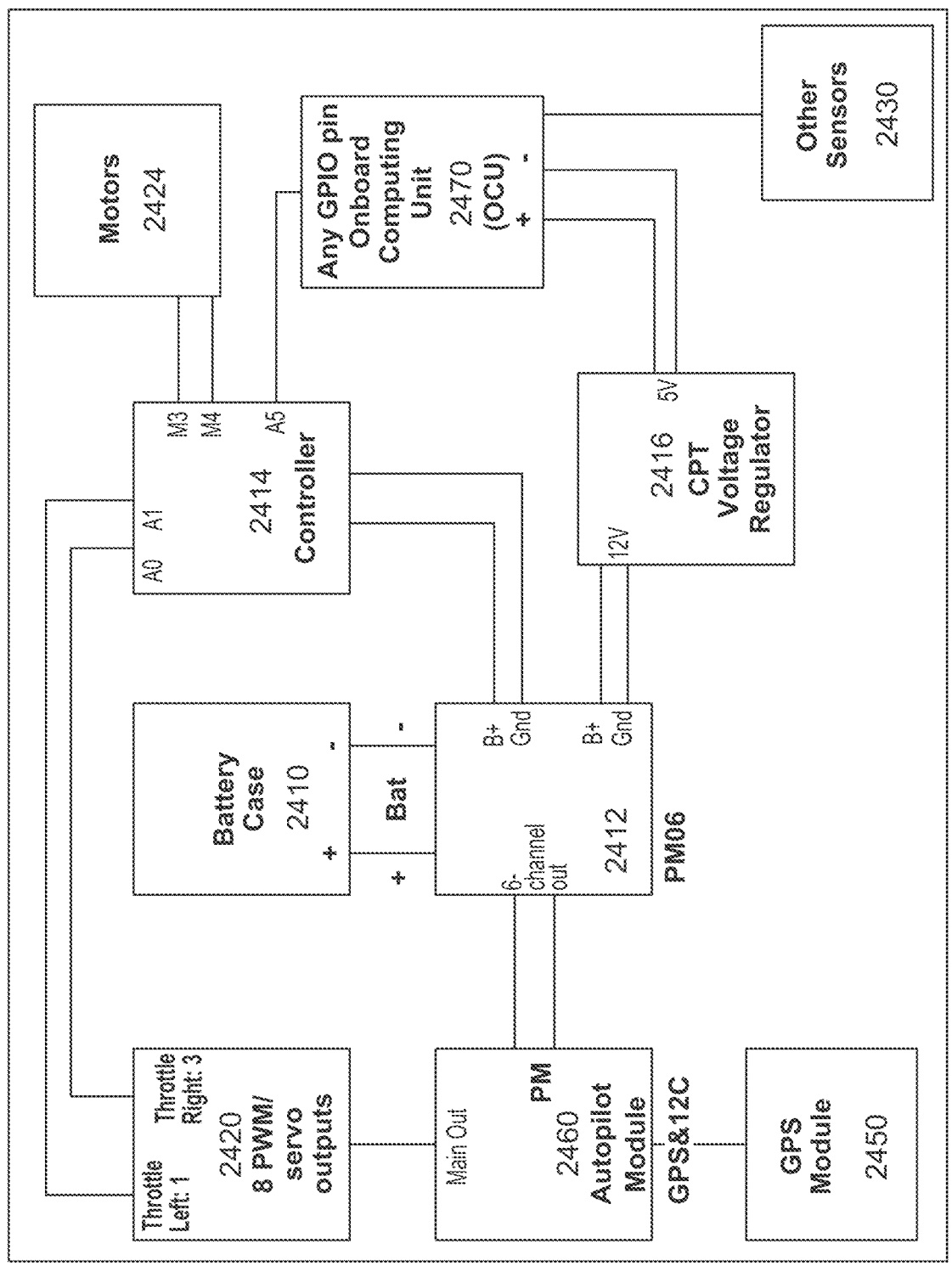
FIG. 24 is a schematic diagram of an architecture of a control system associated with an autonomous vehicle, according to an embodiment.

An example embodiment of CSAV is shown in FIG. 24. CSAV includes one or more GPS modules 2450, and an autopilot module 2460. In an example embodiment, a central battery 2410 is connected to the power inverter 2412, which directly powers autopilot module 2460, a controller 2414, and feeds a voltage regulator 2416. Autopilot module 2460 is connected to GPS module 2450, and separately sends pulse-width modulation (PWM) commands to servo outputs 2420. Controller 2414 issues control inputs to the system, namely to motors 2424 and servo outputs 2420, and feeds data back to onboard computing unit 2470. Voltage regulator 2416 powers the onboard computing unit 2470, and computing unit 2470 exchanges data with controller 2414 and other sensors 2430.

In various embodiments, one or more tags (herein referred to as April Tags) on an aircraft, which needs to be towed (e.g., one or more tags located on a ground contacting structure of the aircraft) may be used for identification and alignment purposes by the autonomous vehicle. In some cases, cameras of the autonomous vehicle may be used to align with April Tags, and in other cases, when April Tags include RFID tags, NFC communication with April Tags may be used for alignment of the autonomous vehicle.

In various embodiments, various functions of the CSAV are used for towing an aircraft from FATO to a parking zone. CSAV is configured to perform an autonomous navigation (e.g., compute and adjust the navigational path based on known boundary restrictions and collision detection), as well as base station communication with the autonomous vehicle and data processing from various sensors and cameras of the autonomous vehicle (e.g., the data processing may include CV for determining the collision detection).

Also, CSAV determines when an autonomous vehicle requires to be navigated to a charging station (which may be co-located with the base station or elsewhere on the aircraft facility). CSAV includes an ability to recognize charging needs and self-navigate to the charging station (autonomous navigation the charging station may use similar navigational algorithms as autonomous navigation to a ground contacting structure of an aircraft), and align and dock with the charging station (using various sensors of the autonomous vehicles, similar to how the autonomous vehicle aligns with the ground contacting structure).

Commands to execute these operations may be transmitted from the base station to the vehicle (or, in some cases, data from the vehicle may be transmitted to the base station), and acknowledgments, status updates, and other messages may be transmitted between the vehicle to the base station, using, for example, the vehicle's comm module 160. (FIG. 5) in conjunction with the aircraft operator's existing infrastructure. These phases are described in more detail below.

Figure 25:
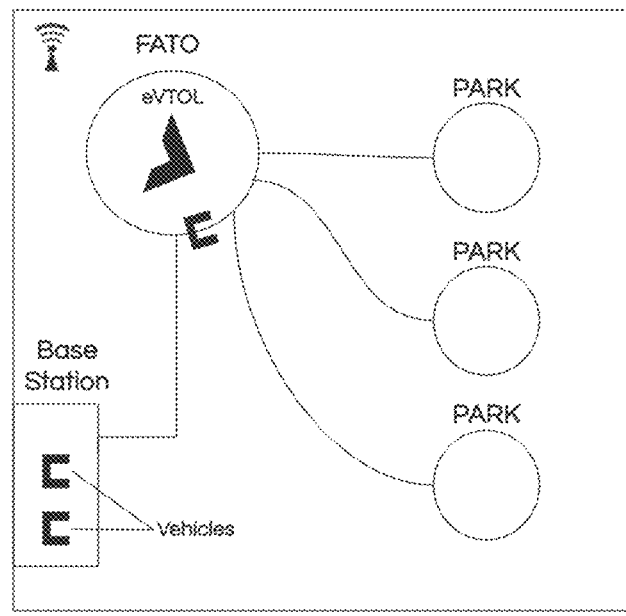
FIG. 25 is a diagram of an aircraft facility according to an embodiment.
Figure 26A:
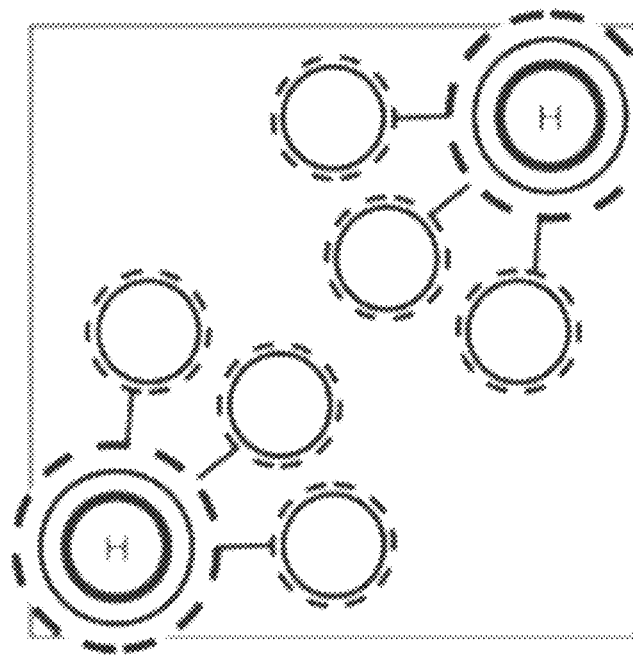
FIGS. 26A to 26D are examples of alternative configurations for skyports, showing variations of FATO and parking geometries.
Figure 26B:
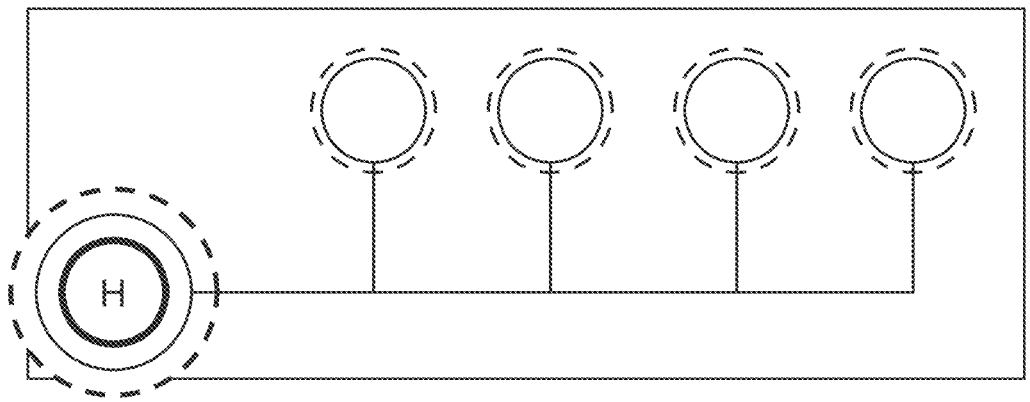
Figure 26C:
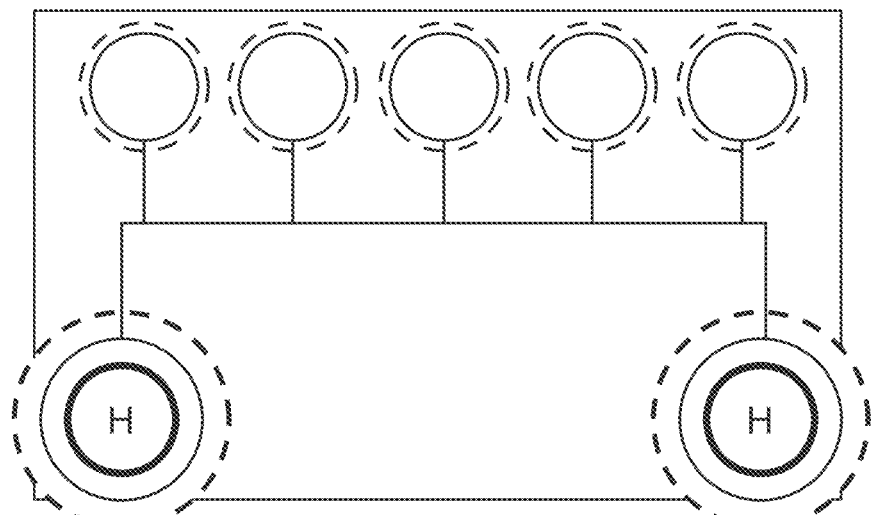
Figure 26D:
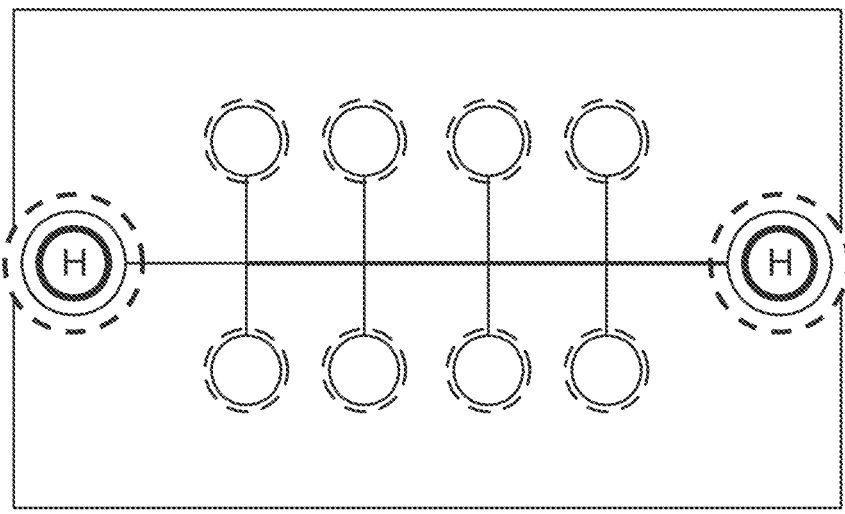

Base Station Dispatches Vehicle:

According to the position and status of the vehicles operating at the aircraft facility, the base station selects an appropriate vehicle (e.g., one that is operational, is not currently engaged in another task, has sufficient stored energy to complete the new task) and dispatches the vehicle to move an aircraft between locations on the aircraft facility. For example, as shown in FIG. 25, the aircraft may have recently arrived at a final takeoff and landing location (FATO) and needs to be moved to one of the parking or passenger unloading locations PARK. In an example embodiment, FATO may be part of an aircraft facility (AF). (Other configurations of aircraft facility, with different numbers and arrangements of FATO and parking locations, are shown in FIGS. 26A to 26D.) The vehicle may receive the repositioning command from the base station over a WiFi network through the WiFi module 161 in the vehicle's comm module 160. The vehicle may determine its position at any point along its path from its current position to the aircraft's location with precision (e.g., to the nearest centimeter) using the GPS module 151 in the vehicle's sensor stack 150.

Transit to FATO:

An autonomous vehicle can navigate from any arbitrary location on the aircraft facility to a specific target, e.g., an aircraft on the FATO. The vehicle can approach the target, such that its front end directly facing the aircraft GCS, using one or more sensing modalities from the vehicle's sensor stack 150. The vehicle's primary systems may include, but are not limited to, computer vision (e.g., using video analytics software running on the computing unit 170 or within the sensor stack 150, analyzing data from camera(s) 153, local positioning module(s) 151 and an inertial measurement unit (IMU) 156 in sensor stack 150, which work together to achieve this goal). In some cases, the target position and orientation are given by the base station a-priori. The aircraft's GCS (the target for the vehicle) may be marked by a suitable vehicle identification tag mounted on the GCS (e.g., a structural member to which the GCS is coupled, or a structural member of the GCS), such as an April Tag, QR Code, RFID tag, or other digital tag designed to be reliably identified either by computer vision systems or by a system that may employ a near-field communication, such as Bluetooth communication or any other suitable near-field communication. The vehicle may be localized in its environment and may maintain geographical awareness (by, for example, the GPS module 151 in the vehicle's senor stack 150) to achieve point-to-point motion planning for routes.

Error Tolerant Pathing Algorithm Overview

An autonomous vehicle may employ an algorithm (e.g., operating on its computing unit 170) to utilize its navigational sensors to navigate to the target while adjusting for built-in error. During a first stage (stage 1) of an aircraft towing algorithm, the vehicle is configured to move to acquire a line-of-sight of an aircraft.

An autonomous vehicle may navigate from its initial position (e.g., at base station) to a target point (TP) directly in front of the aircraft and its GCS. The position of the target aircraft is relayed by the base station to the vehicle, and a set of reference trajectories are generated by the autopilot module 171 from the vehicle's initial position to the target point. The vehicle's controller module 172 optimizes a well-defined cost function based on the state of the system, by tuning the control inputs to the system over a finite, receding prediction horizon. The dynamic model provides a means of predicting future states based on the starting state and the control inputs. Other constraints can be provided to guarantee the feasibility of the solution. The optimization problem can be solved rapidly in practice by specifying the cost function to be convex, or by generating a finite amount of reference trajectories and executing the optimal one. At every iteration, the vehicle's trajectory is dynamically updated in real-time to adjust course as necessary.

Algorithm: Navigation to Handoff Point

Figure 27:
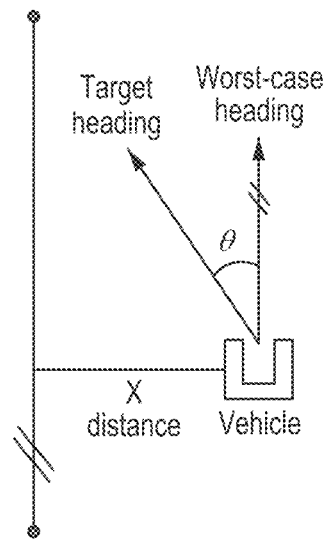
FIG. 27 is a diagram of the error-tolerant course adjustment.

In various embodiments, an autonomous vehicle makes real-time adjustments to its course as it travels to the handoff point, as shown in FIG. 27. The handoff point is a waypoint determined by the vehicle to navigate within proximity of the GCS for last-mile precision alignment. The vehicle first approximates the direction of the handoff point from its current location as follows. First the vehicle takes a position reading (e.g., from the GPS module 151 in the sensor stack 150). Second, a path is generated by the autopilot module 171 using the initial position reading and the target handoff point as an ideal reference trajectory. These paths are referenced by the skyport or airport taxiways when the vehicle is towing an aircraft. Otherwise, the paths are freeform between the initial and target positions and are subject to the constraints of minimizing Euclidean distance between said points and avoiding other vehicles. In an example embodiment, a path may be a straight line. Third, the angle of the straight line relative to a fixed direction (e.g., direction from south-to-north) is recorded. The angle defines the direction of the straight line, and such a direction (herein, also referred to as heading) is defined as the ideal reference heading or target heading, as shown in FIG. 27.

In an example embodiment, an autonomous vehicle is configured to proceed in the ideal heading direction, straight ahead with reference to the vehicle axis. In some cases, when there is some built-in sensor noise associated with these measurements, an averaging procedure may be employed to filter out the noise. After determining the ideal heading direction, the vehicle is configured to drive in the ideal heading direction towards the handoff point, with its instantaneous position along its path being iteratively recorded by GPS module 151. The vehicle may have a set tolerance offset from the reference trajectory; when this tolerance is exceeded, a trajectory adjustment may be needed, and a new set of reference trajectories may be generated based on this deviation and may be dynamically updated during each iteration until the vehicle duly adjusts its heading course to align with target. This process may be repeated until the vehicle is within a defined tolerance distance of the handoff point.

Collision Detection & Avoidance in Transit:

In some embodiments, the vehicle may detect and avoid obstacles, whether fixed (e.g., structures on the aircraft facility, boundaries of drivable surfaces), stationary (e.g., other vehicles, aircraft at other FATOs, personnel that are not moving), or in motion (e.g., vehicles, aircraft or personnel). Obstacle detection may be performed with the aid of suitable sensors in the vehicle's sensor stack 150, e.g., Lidar(s) 152 and/or ultrasonic range-finding sensor(s) 154 and may be augmented by high-resolution machine vision camera(s) 153. Lidar sensor(s) 152 provide dense 2D-point clouds of objects within a set periphery of the vehicle, with a frequent refresh rate for real-time spatial awareness. An array of ultrasonic range sensor(s) 154 delivers range measurements of objects lying in the direction normal to the face of the sensor, which operates well in adverse weather conditions and consumes less power when compared to Lidar(s) 152. Lastly, computer vision is used to associate points in the Lidar 152 and range maps with features in images. This sensor fusion approach delivers robust object detection by capitalizing on the data streams of each sensor to eliminate potential blind spots and depth deficiencies. When an obstacle has been detected, it may be classified (e.g., fixed structure, personnel, other vehicles), determined to be stationary or in motion, and if in motion its trajectory is predicted. The vehicle's planned path may then be adjusted to avoid collision with, or approach within an undesired proximity to, the obstacle.

During a second stage (stage 2) of aircraft towing algorithm, the vehicle is configured to move to dock with an aircraft. Once the vehicle has reached the handoff point, it may turn to best align itself with the ID tag on the aircraft. Once the ID tag is acquired (and, for example, the identity of the aircraft to be moved is confirmed, the configuration of the GCS for that aircraft is retrieved), the vehicle may then drive towards the aircraft until it has cm level accuracy on the distance to the tag. The vehicle may then rotate past the heading of the ID tag, so that the vehicle's current heading can now intercept the tag perpendicularly (while still keeping the ID tag in the field of view of the vehicle).

Vehicle Precision Alignment with GCS

Algorithm—Determining Handoff Point

The purpose of the handoff point is to get the vehicle in a position where the computer vision (CV) system or another suitable communication system (e.g., ultrasound generating and sensing system, or a near-field communication system using radio signals such as Bluetooth) can reliably pick up the digital identification tag on the target. In some cases, a combination of communication systems may be used (e.g., Bluetooth and CV system) for reliable and precise positioning and movement of the vehicle. The requirements for the handoff point are determined by the limitations of the computer vision system. These parameters may include the camera's 153 field of view (FOV), the computer vision package used to identify digital tags, and the vehicle's position errors resulting from its prior navigation leg. Using these constraints, the vehicle will determine the location of the handoff point using the following equation (see FIG. 28 for an example):

$$\text{RequiredDistance} = (\text{Error}_{Navigation} + \textit{Tag Width}/2) * \tan(90° - (FOV/2 - \text{Error}_{orientation}))$$

Figure 28:
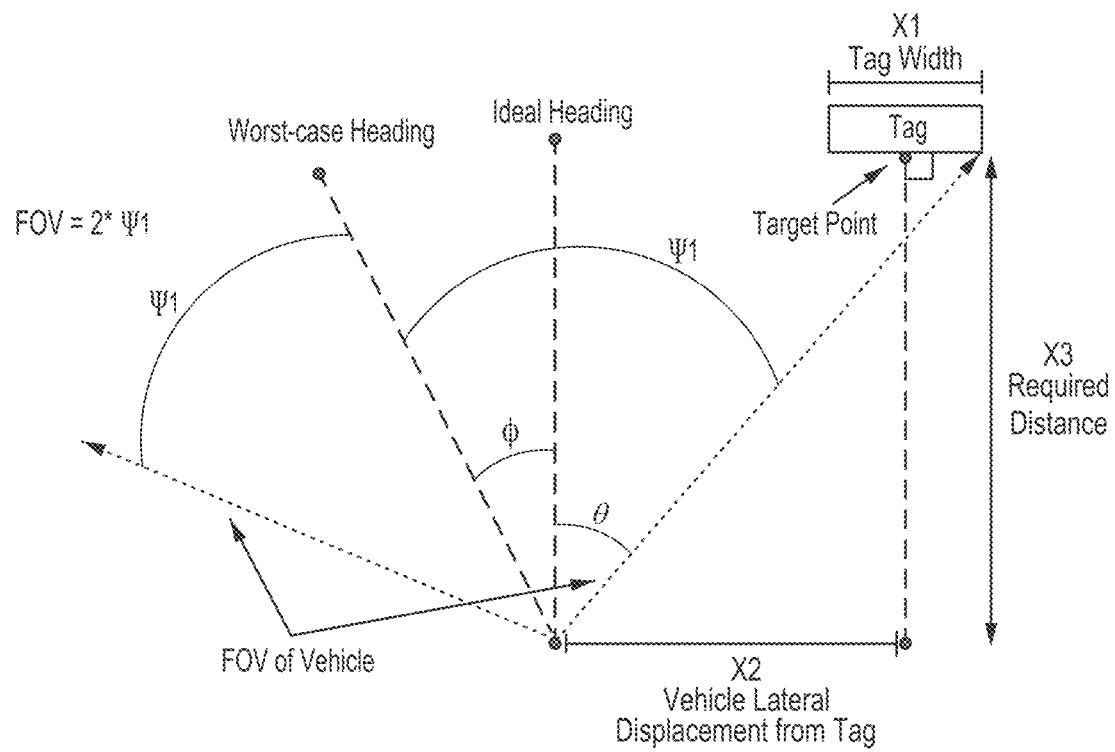
FIG. 28 is a diagram displaying heading directions calculated for determining a path to a tag location according to an embodiment.

In FIG. 28, required distance is shown by X3, $\text{Error}_{Navigation}$+Tag Width/2 is shown by X2, (vehicle, lateral displacement from the tag), FOV=$2 \times \psi_1$, and $\text{Error}_{orientation} = \phi$ thus, (FOV/2−$\text{Error}_{orientation}$)=θ.

Figure 29:
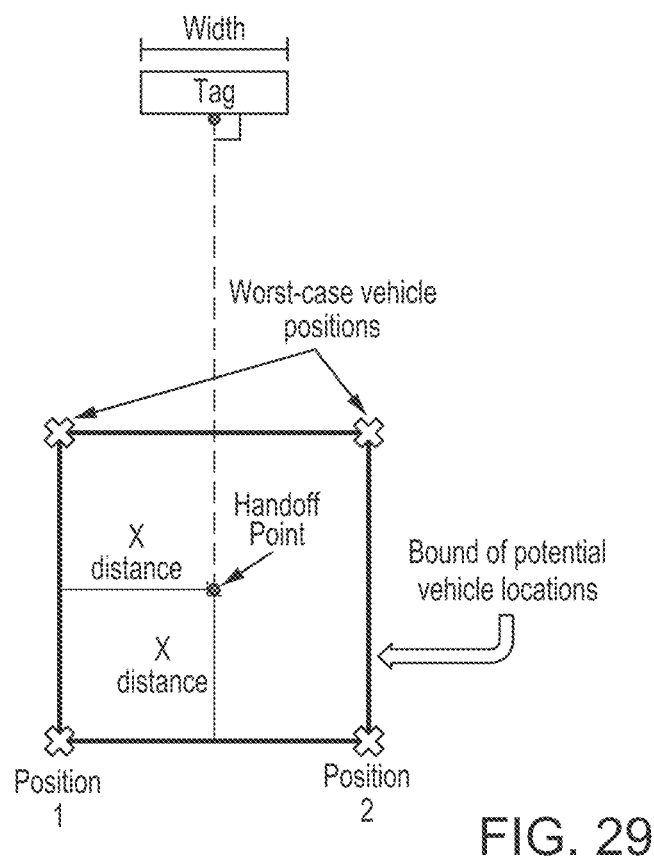
FIG. 29 is a diagram of the possible positions of the vehicle after navigating to a handoff point.

As shown in FIG. 29, a bounding box of size 2x×2x centered at the handoff point may be defined as to enclose all possible final positions (e.g., positions 1, 2, and other worst-case positions being vortices of the bounding box) of the vehicle post-navigation. Within this area of interest, the vehicle may adjust its orientation to position the tag within its field of view. The distance to a hypothetical handoff point is shown as Y in FIG. 30.

Algorithm—Handoff to Dock

Once the vehicle is aligned with the GCS, a precise system may align the vehicle's coupling mechanism correctly with the wheel of the aircraft's GCS. The vehicle identifies an ID tag on the GCS of the aircraft. Precision alignment takes place when the vehicle is close enough to the aircraft, and the wheel of the target aircraft's GCS is within the FOV.

When the vehicle reaches the target point, it rotates to face the aircraft's GCS, as necessary, based on the previously known orientation and position of the aircraft (this rotation herein is referred to as a secondary rotation). The computer vision system may then lock onto the digital ID tag attached to the GCS and determine the relative position between the tag and its current location. A path may then be calculated which aligns the vehicle precisely with the tag, using a simple state-feedback controller to minimize distance. Once calculated, the vehicle may move along this path to intercept the target, using both the IMU 156 and computer vision system to adjust course as needed.

Figure 30:
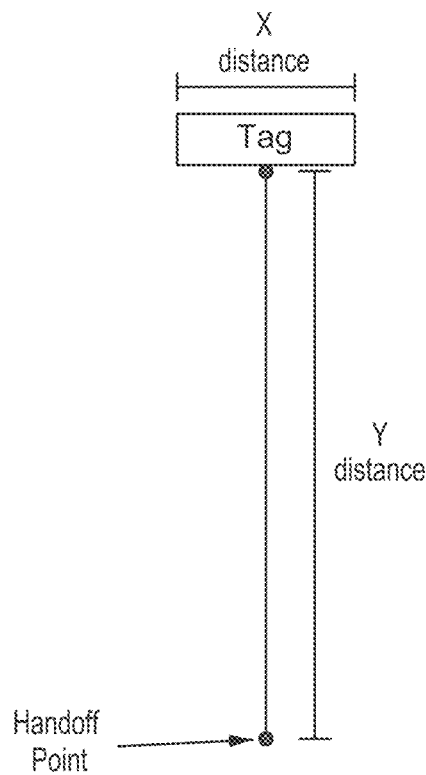
FIG. 30 is a diagram of the location of the handoff point.
Figure 31:
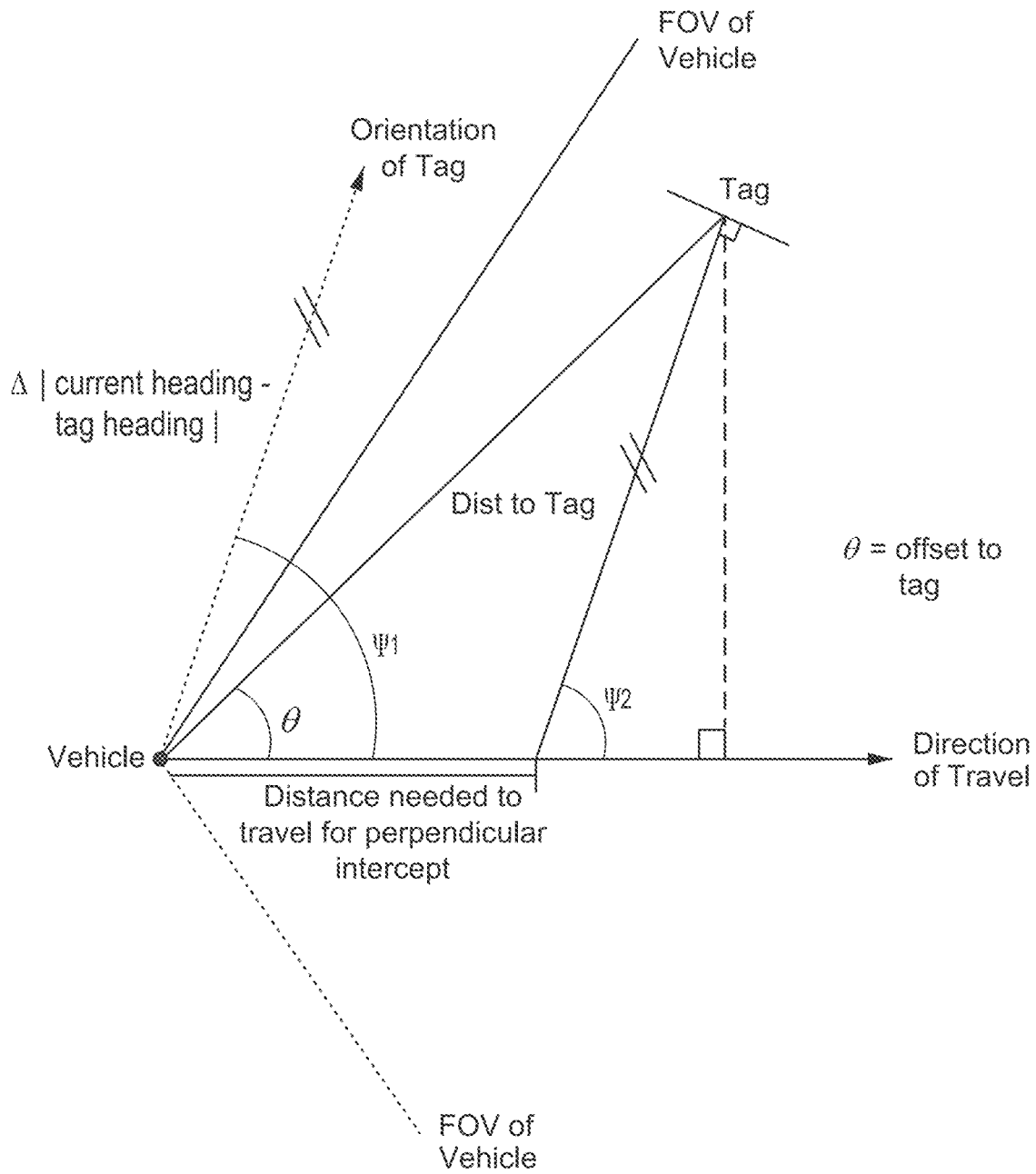
FIG. 31 is a diagram of the vehicle used for calculating the distance needed for a perpendicular interception with tag.
Figure 32:
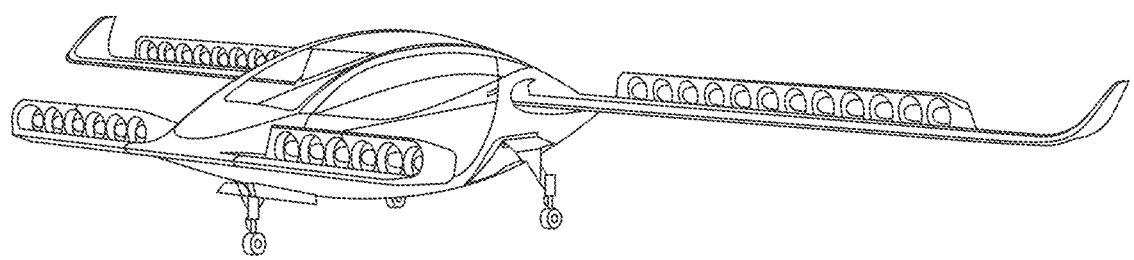
FIGS. 32-37 show examples of eVTOL aircraft of different propulsion formats that can be engaged and moved by disclosed vehicles.
Figure 33:
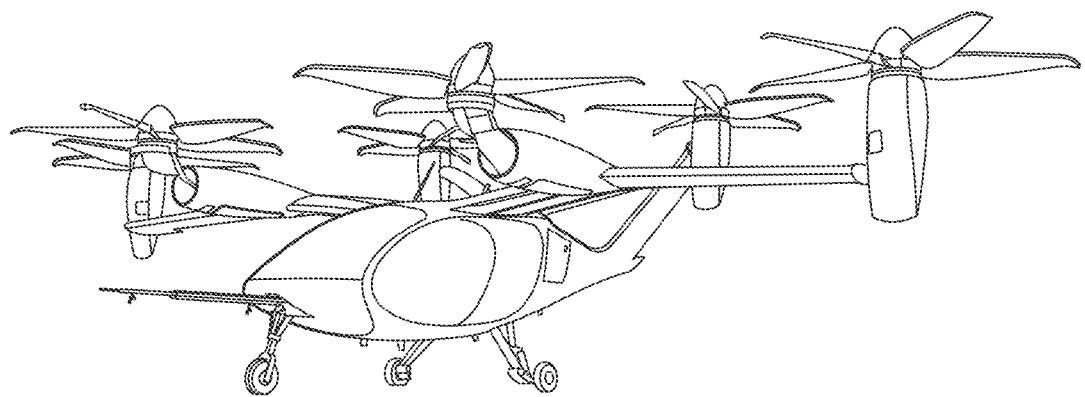
Figure 34:
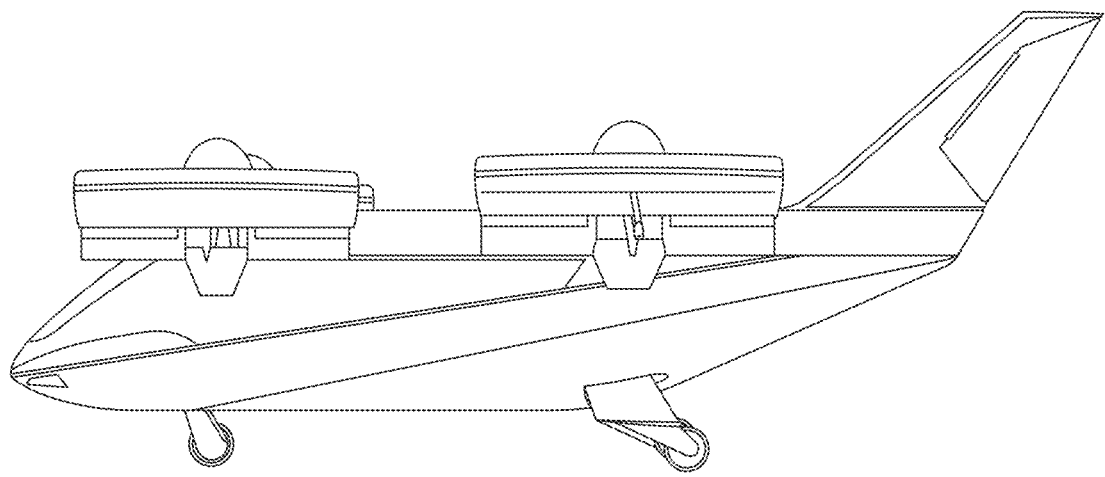
Figure 35:
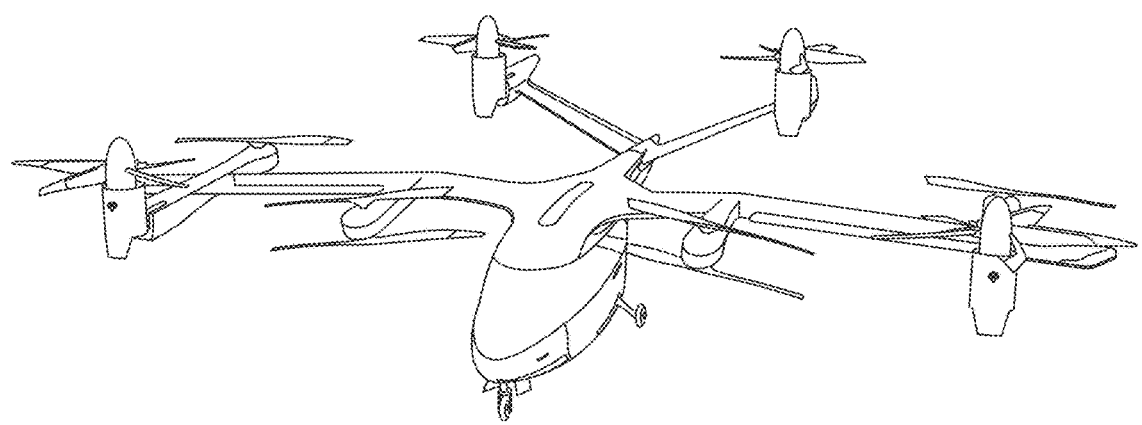
Figure 36:
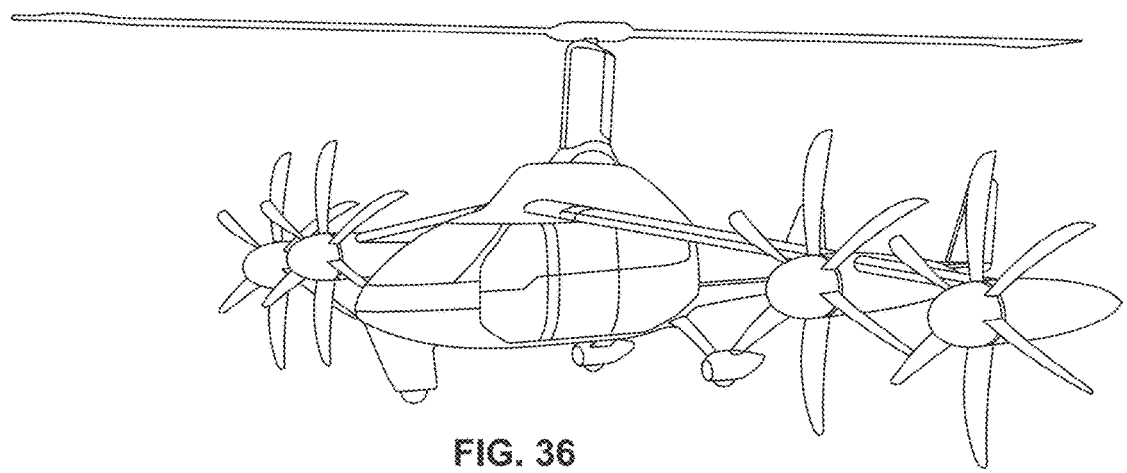
Figure 37:
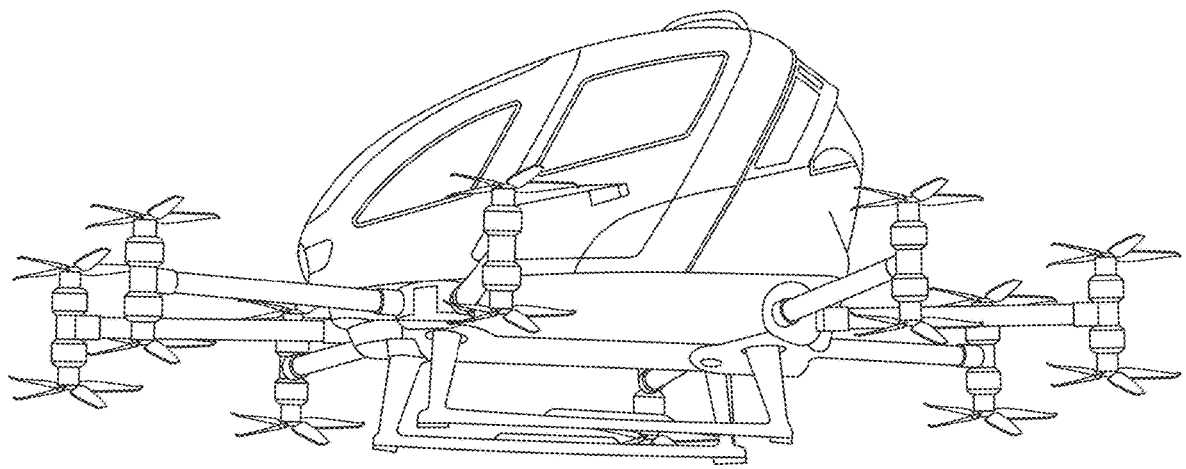

FIG. 31 shows the position and orientation of the vehicle relative to the aircraft after this secondary rotation. Following the secondary rotation, the vehicle may then take an offset reading from the CV system (offset$_x$), e.g., by measuring how many pixels the center of the ID tag is from the center of the vehicle's CV FOV. From this Euclidian offset, the angular offset of the tag in radians (theta) may be calculated using the formula below.

$$\theta = (\text{offset}_x / X\_OFFSET\_MAX) * (fov\_rad/2)$$

where fov_rad is an angle corresponding to the field of view in radians and is the same as angle ψ in FIG. 30.

The vehicle can then query the CV system for the current distance to the tag. Finally, the angle between the direction of travel and the direction of the tag can be calculated using the equation below.

$$\psi_2 = \psi_1 = \text{heading}_{current} - \text{heading}_{tag}$$

In the equation above, heading$_{current}$ is a current heading of the vehicle, and heading$_{tag}$ is a heading of the vehicle that it should take to position the vehicle perpendicular to the tag, and in close proximity to the tag. Using these variables, the distance needed to travel along the current heading for a perpendicular offset may be calculated by:

$$\text{Distance} = \text{distToTag}*\cos(\theta) - [\text{distToTag}*\sin(\theta)]*\tan(\pi/2 - \psi_1)$$

Herein, Distance is a distance needed to travel for perpendicular intercept as shown in FIG. 31.

The vehicle may then travel this distance forward and rotate to face the heading of the tag. The vehicle may approach to dock with the GCS, and course-correct to continuously minimize its lateral distance with the tag.

Algorithm—ID Tag Characterization

The core capabilities for ID tag characterization may include, but are not limited to determining:
1. the maximum and minimum distance that can be measured (X (horizontal), Y (vertical), Z(depth)) from vehicle to GCS;
2. accuracy and precision of distance measurements;
3. the yaw tolerance (angle) at which tags can still be detected; and
4. accuracy and precision of angle measurements.

Further, the Potential Variables of Interest May Include:
1. lighting conditions;
2. presence of an LED light ring around camera;
3. tag size; and
4. camera 153 lens.

Measurement Methodology

In various embodiments, a special care is taken to align reference ground truth measurements, where the median measurement over a period of time is taken for all sensors to generate stable readings. For example, if the GPS module's 151 location reading is characterized by a drift error, the median of several recorded measurements of a known reference position is recorded to obtain a ground truth.

XYZ Positioning

In various embodiments, a software application associated with an autonomous vehicle (e.g., the software application may be run by the computing unit 170) is configured to read camera 153 data and determine based on the data the unitless measurements. These unitless measurements are converted to real length and angular units (e.g., length units may be measured in feet, inches, meters, centimeters, millimeters, and the like, and angular units may be measured in radians, degrees, or minutes of a degree).

Camera 153 Setup

In various embodiments, an autonomous vehicle may use the following criteria (having associated defined labels) to optimize detection distance abilities:
1. reasonable usage range: range in which measurements can be within an acceptable interval from the true distance;
2. minimum detection distance: minimum distance away tag is located for detection;
3. accurate to +/−x cm: range at which calculated measurement is within x cm of the true distance;
4. maximum stable detection distance: maximum range at which the tag can be consistently detected on each frame;
5. maximum unstable detection distance: maximum range at which the tag can be detected at all. In some cases, the tag may only be detected on a few frames captured by camera of an autonomous vehicle, and at this range (i.e., at the maximum unstable detection distance), at some of the frames captured by the camera, "no tag is found" may be determined by CV system. The frames for which "no tag is found" may be captured in between the frames for which the "tag is found."

During a third stage (stage 3) of an aircraft towing algorithm, an autonomous vehicle is configured to move the aircraft docket to the vehicle to a parking pad. In an example embodiment, once the vehicle couples with the GCS of the aircraft, it uses its known position, the known bounds of the surface tarmac, any restricted zones and the location of the other vehicles, as well as the size and orientation of the aircraft being moved by the vehicle, to autonomously determine the optimal route in moving the aircraft to the desired parking pad. The location of the parking pad is issued by the base station, and the path to navigate is designated by a cloud-based traffic management system that can communicate with the vehicle via the comm module 160. This path is dynamically updated with respect to the real-time position of the other vehicles at the aircraft facility, and collision warnings that are relayed back from the vehicles, which could be collisions with other aircraft, vehicles, humans, or other miscellaneous objects. Sensor stack 150 is now aware that an aircraft is being moved by the vehicle, and as such, points in the Lidar 152's map and pixels in the camera 153 images corresponding to the aircraft are disregarded as obstacles and obstructions that must be avoided. The points of the Lidar 152's map that remain relatively static in the local coordinate frame of the vehicle for the duration of motion are marked as entities that are coupled with the vehicle (e.g., an aircraft) and not an obstacle.

During a fourth stage (stage 4) of aircraft towing algorithm, an autonomous vehicle is configured to move to the charging station. The vehicle may be charged when the vehicle is not actively engaged in an aircraft movement operation. For example, the vehicle may be moved to and be stationed at the base station. Optionally, during some or all of the duration of such inactive periods, the vehicle may engage with a charging station, e.g., at the base station or elsewhere at the aircraft facility. The vehicle is configured to have an electrical inlet that allows the vehicle to recharge its energy storage (in the form of batteries as described above, or resupply other energy storage modalities, e.g., hydrocarbon fuel, hydrogen, and the like, as described above) after each utilization cycle. The vehicle may be capable of recognizing its power state (as described above) and can autonomously navigate to a base station charging port and dock itself for charging. Alternatively, a human operator can manually charge the vehicle.

In some embodiments, a below-nominal voltage drop or level may trigger a charging threshold, which instantiates a command for the vehicle to proceed to charge. The vehicle may commence navigation to the charging station, a location known a-priori, from its current location (whether a landing zone, taxi route, or parking zone). The vehicle may notify the base station via the cloud services network that the vehicle has retired to charge and cannot receive additional commands to perform tasks.

The vehicle may navigate to the charging port via a proxy handoff point as an initial target location, executed in the same way for previous handoff points. The vehicle may orient itself to align its electrical inlet (which can have the form of charging pins) with the charging port at the station, using ID tags for last-mile visual alignment as well. Lateral distance may be minimized to align with the port until the vehicle docks to charge. A series of lights may be used to represent the state of the battery, that when fully illuminated to indicate to a human that the vehicle is fully charged. The base station is also subsequently notified via WiFi or the cloud network that the vehicle is charged and ready to be dispatched. In the event of an autonomous misalignment, there is a plug that can be connected to the vehicle manually.

Aircraft

The vehicle may be used to service aircraft in the UAM, General Aviation, and Commercial Aviation markets that have a ground contacting structure (GCS), which may include a nose landing gear (NLG) or landing skids (skids), among others. FIGS. 32-44 show examples of the classes of aircraft that are supported by the vehicle. FIGS. 32-37 show examples of eVTOL aircraft of different propulsion formats that can be engaged and moved by disclosed vehicles.

Figure 38A:
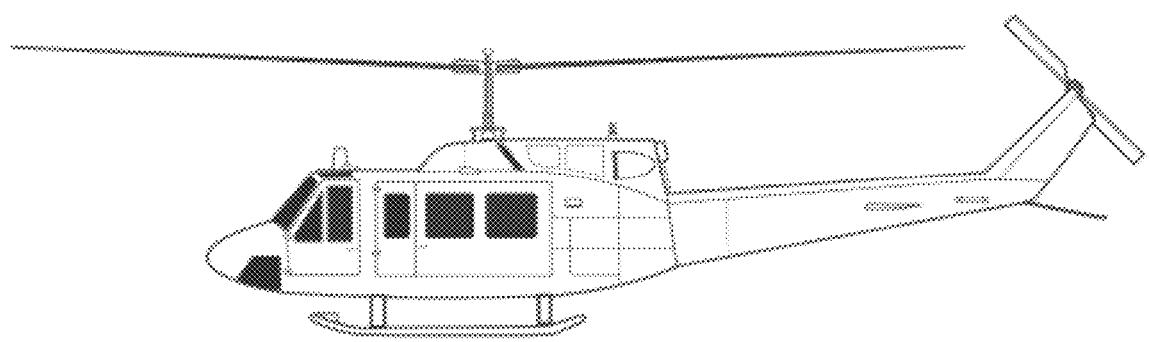
FIGS. 38A and 38B show examples of a rotorcraft vehicles that can be engaged and moved by disclosed vehicles.
Figure 38B:
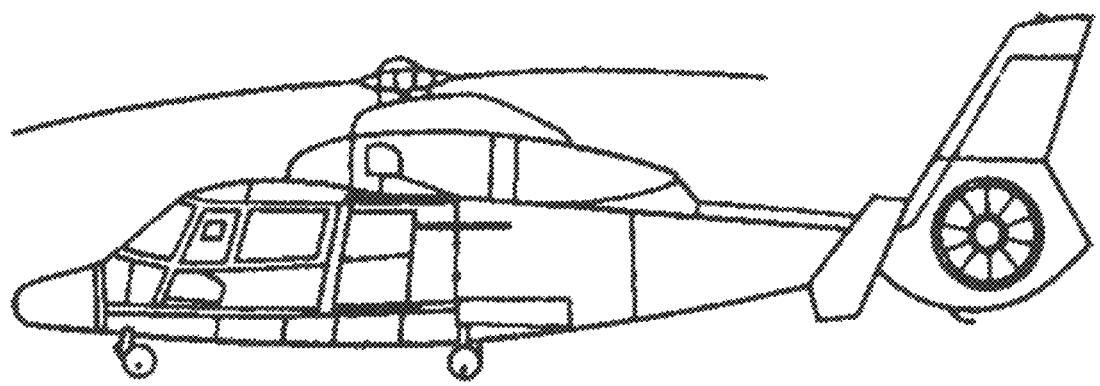
Figure 39:
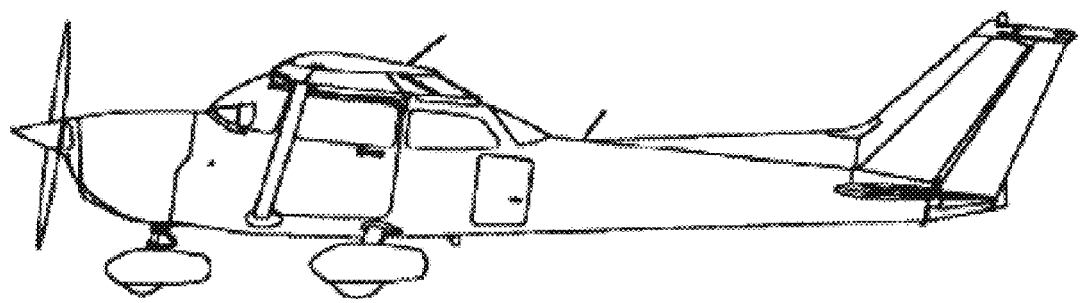
FIG. 39 shows an example of a single engine, propeller-driven, general aviation recreational aircraft that can be engaged and moved by disclosed vehicles.
Figure 40:
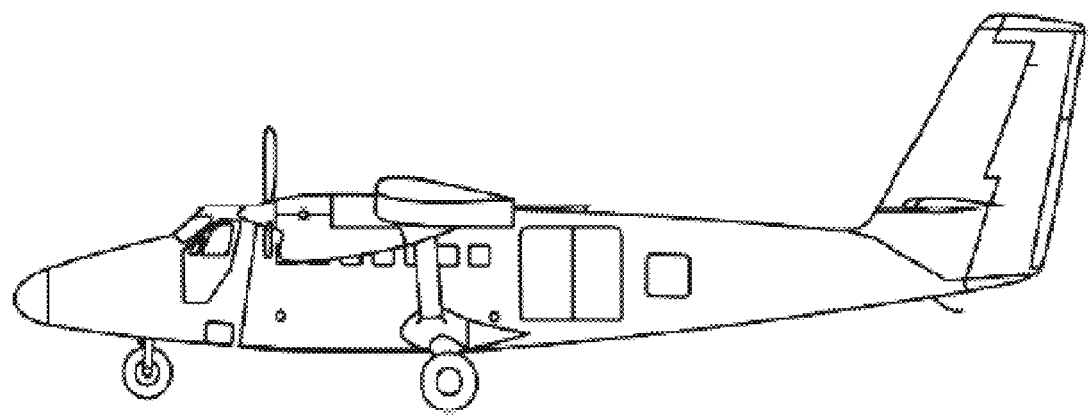
FIG. 40 shows an example of a twin turbine engine propeller-driven general aviation utility small commercial that can be engaged and moved by disclosed vehicles.
Figure 41:
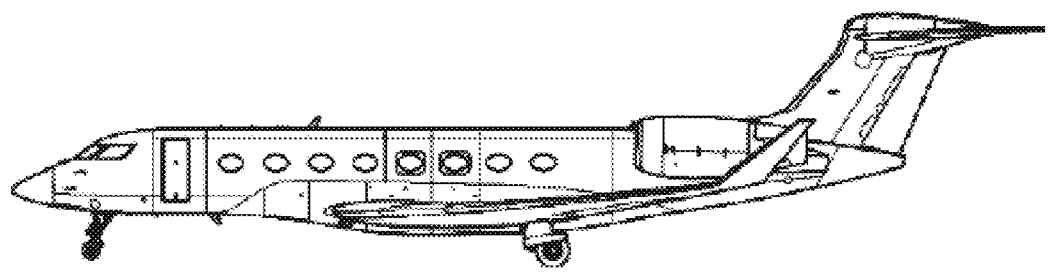
FIG. 41 shows an example of a twin engine, rear mounted turbofan private transport aircraft that can be engaged and moved by disclosed vehicles.
Figure 42:
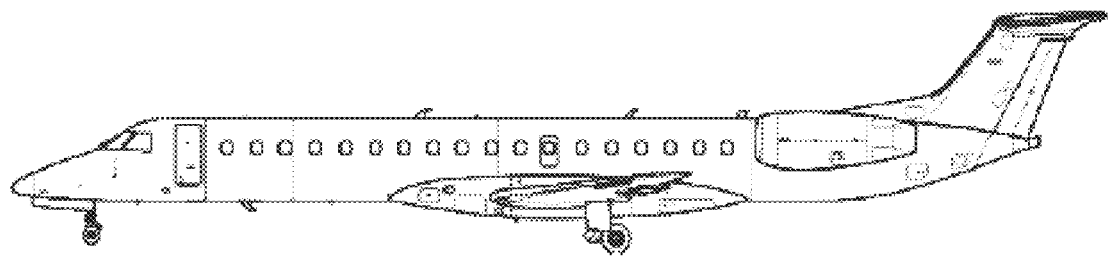
FIGS. 42 to 44 are examples of commercial airliners of a range of sizes that can be engaged and moved by disclosed vehicles.
Figure 43:
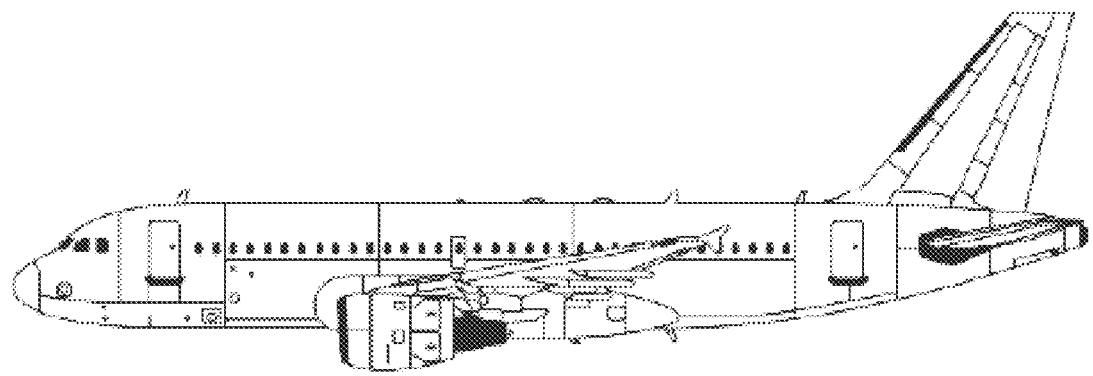
Figure 44:
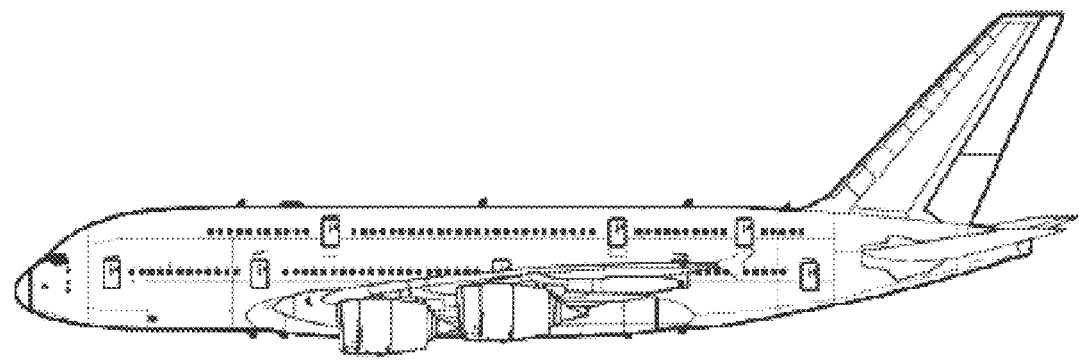

It should be appreciated that any other aircraft (besides eVTOL) may be towed by an autonomous vehicle. For example, rotorcraft (as shown in FIGS. 38A and 38B) can be towed by the vehicle, single engine, propeller-driven, general aviation recreational aircraft (FIGS. 39 40), turbine engine propeller-driven general aviation utility as well as small commercial aircraft (FIGS. 41-44) that can be engaged and moved by disclosed vehicles.

Figure 9A:
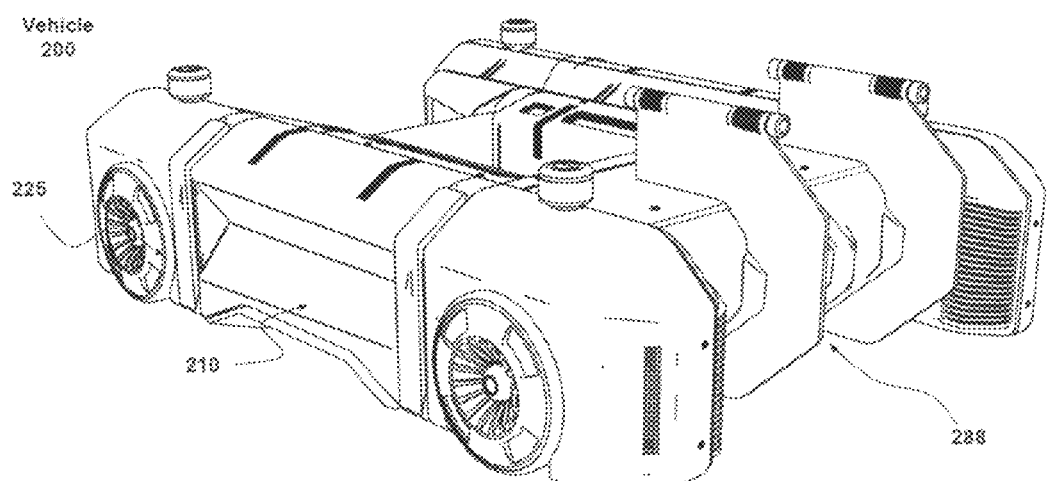
FIGS. 9A to 9D are rear perspective, side, front, and top rear perspective views, respectively, of a vehicle according to another embodiment.
Figure 9B:
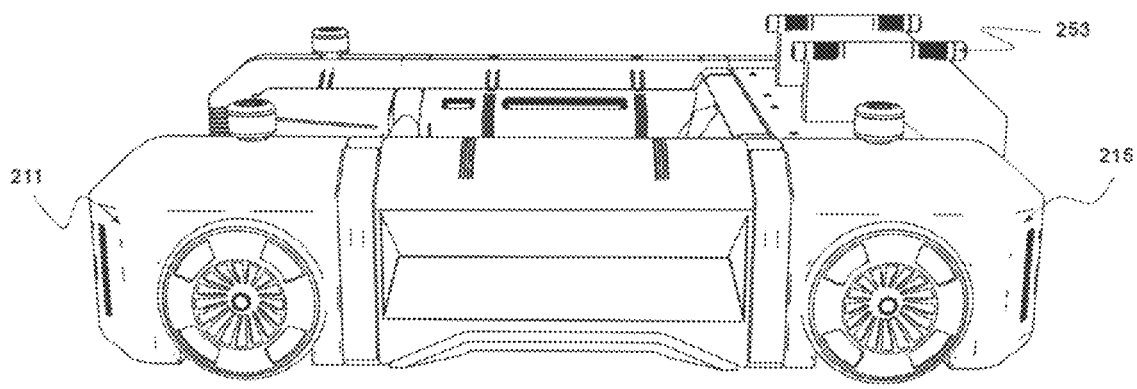
Figure 9C:
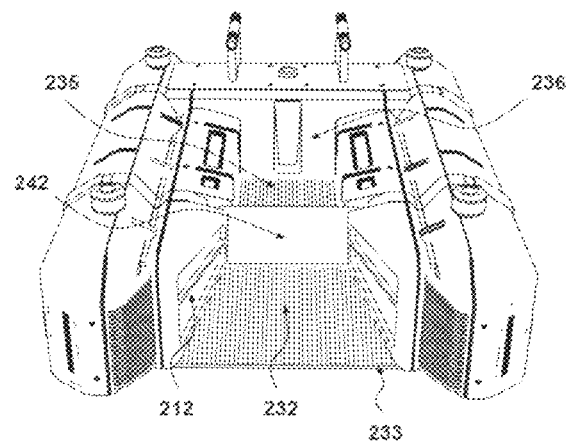
Figure 9D:
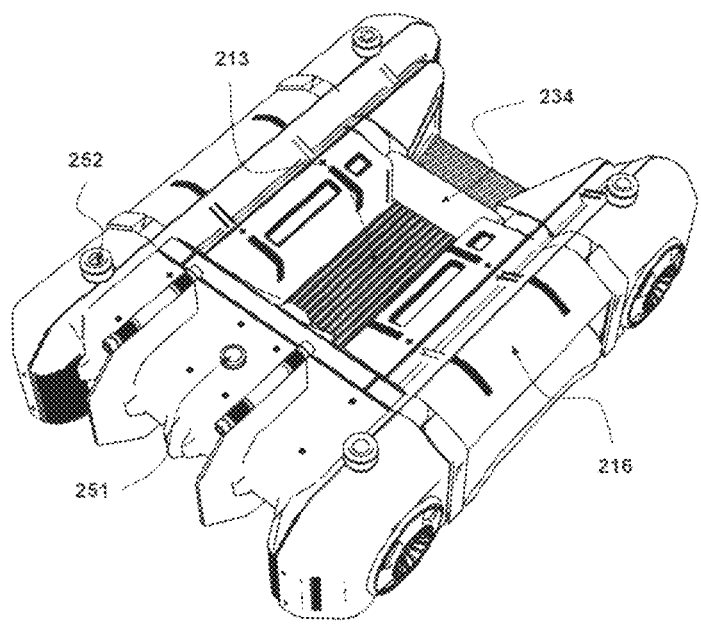
Figure 9E:
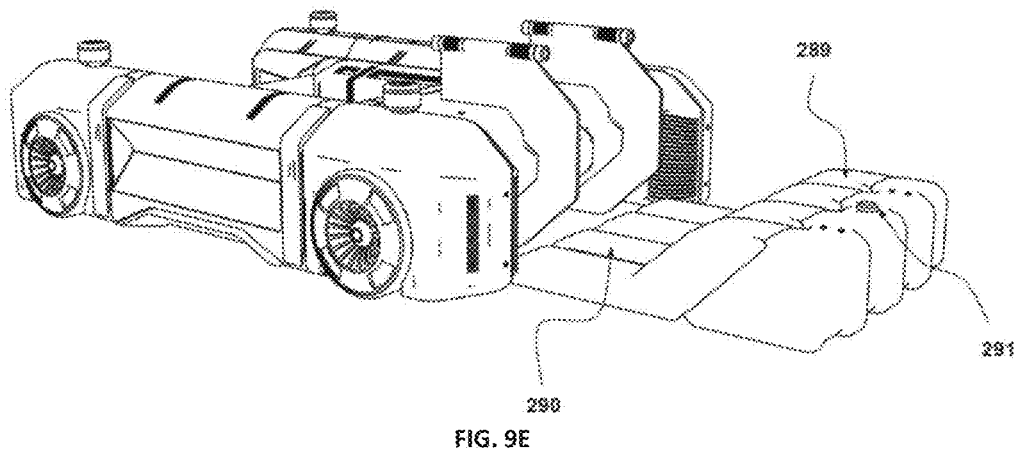
FIGS. 9E and 9F are rear perspective views of a vehicle according to the embodiment of FIGS. 9A to 9D showing the vehicle engaging with a charging mechanism of a charging station according to an embodiment.
Figure 9F:
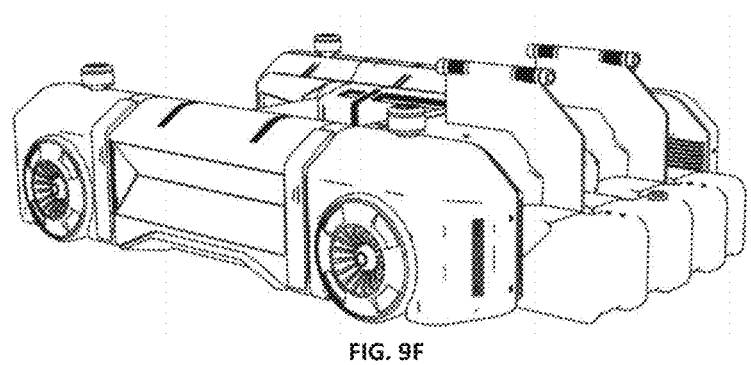
Figure 9G:
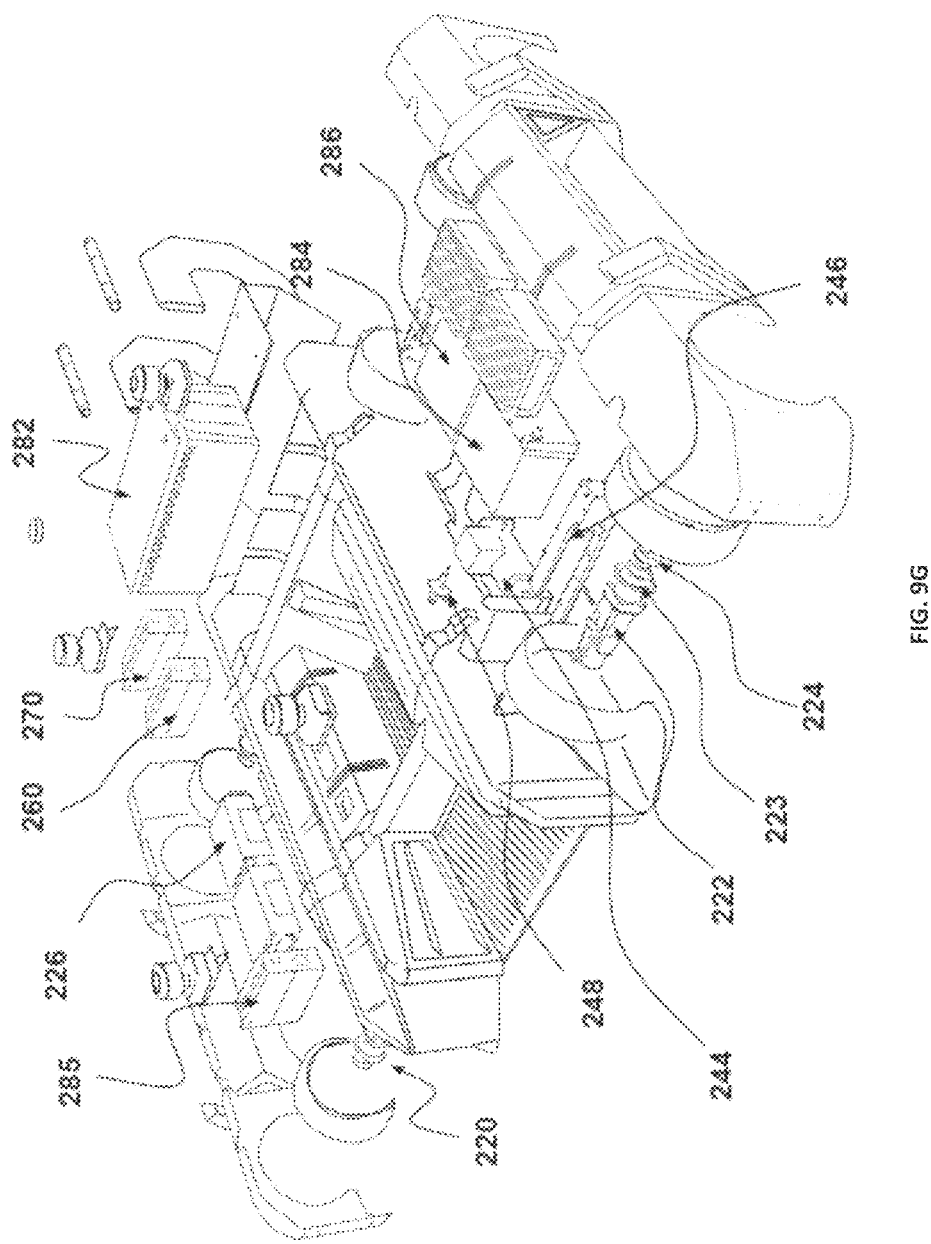
FIG. 9G is an exploded view of a vehicle, according to the embodiment of FIGS. 9A to 9D.

As described above, an autonomous vehicle includes a chassis (e.g., chassis 210, as shown in FIG. 9A) for supporting a ground contacting structure (e.g., ground contacting structure GCS, as shown in FIG. 10A) of an aircraft, the chassis includes a housing (herein also referred to as a platform) for holding the ground contacting structure. Such platform may be, for example, platform 213, as shown in FIG. 9D. Additionally, the chassis includes a coupling mechanism configured to facilitate placing a ground contacting structure into the housing. As described above, the coupling mechanism may be any one of the embodiments of coupling mechanisms as shown in FIGS. 11A-23F, or any other suitable coupling mechanisms configured to move the ground contacting structure into the housing. In an example embodiment, the coupling mechanism may be a ramp 232 as shown in FIG. 9C. In various embodiments the coupling mechanism is configured to capture a ground contacting structure of an aircraft, secure the ground contacting structure at a substantially fixed position relative to the chassis of the autonomous vehicle and tow the aircraft by moving the ground contacting structure in a particular direction (e.g., towards a parking area). In some cases, securing the ground contacting structure includes lifting the ground contacting structure above the ground and placing the ground contacting structure into the housing. In some cases, securing the ground contacting structure includes enclosing the ground contacting structure (at least partially) via suitable elements connected to the chassis of the vehicle (e.g., rollers as shown in FIGS. 19A and 19B). In some cases, securing the ground contacting structure in the housing involves preventing the ground contacting structure from moving out of the housing, for example, via a panel 242 as shown in FIG. 9C.

It should be noted that the housing and the coupling mechanism may be tailored for a particular type, size, weight, shape of the ground contacting structure. For example, a first type of housing and a first type of a coupling mechanism may be used for a ground contacting structure being a wheel, and a second type of a housing and a second type of a coupling mechanism may be used for a ground contacting structure being a skid. In some cases, different types of autonomous vehicles may be used to handle different types of ground contacting structures, and in other cases, a chassis may include a replaceable (swappable) module having a suitable housing and/or coupling mechanism for handling a particular type, size, weight, shape of the ground contacting structure. In some cases, a first type of autonomous vehicles may be used for handling a light aircraft and a second type of autonomous vehicles may be used for handling a heavier aircraft (e.g., aircraft which is 50% heavier than the light aircraft). In some cases, an autonomous vehicle may be configured to tow various eVTOLs with various wheel sizes. Further, the autonomous vehicle may be configured to tow eVTOLs with wheels and skids (e.g. the autonomous vehicle may be one-in-all vehicle for towing various eVTOLs with a variety of GCSs).

In various embodiments, the ground contacting structure may be any suitable contacting structure for supporting an aircraft on a ground surface (or liquid surface, e.g., the ground contacting structure may be a float floating on water, and an autonomous vehicle may be configured to move over a surface of the water). For example, the ground contacting structure may be a wheel, a skid, a float, a set of skids or floats, or any other suitable structure or device. In an example embodiment, the ground contacting structure may be located at a nose of an aircraft and may be referred to as a nose landing gear. In various embodiments, an autonomous vehicle is configured to select a particular one of ground contacting structures of an aircraft that can be used for towing the aircraft.

As described above, in an example embodiment, the coupling mechanism may include a ramp extending from the housing to a free end and along which the ground contacting structure can be moved from the free end to the housing. For example, the ramp may be ramp 232, and free end may be an edge of ramp 232 (edge 233, as shown in FIG. 9C). Ramp 232 may extend from platform 235, as shown in FIG. 9C (i.e., housing). In various embodiments, the ground contacting structure may be moved from free end to the housing (i.e., rolled over the ramp starting at edge 233 onto platform 235). Further, the coupling mechanism incudes a movable element (e.g., panel 242, as shown in FIG. 9C) for opening and closing the housing to secure the ground contacting structure in the housing. In various embodiments, the coupling mechanism includes an opening in the housing. The opening is used to move the ground contacting structure into the housing.

In some cases, the coupling mechanism includes a lifting mechanism configured to lift the ground contacting structure from a surface on which vehicle and ground contacting structure are disposed (i.e., lift the ground contacting structure from the ground).

In an example embodiment, the coupling mechanism includes a lateral guide mechanism configured to guide the ground contacting structure into the housing. In some cases, the lateral guide mechanism is configured to guide the ground contacting structure when the ground contacting structure is lifted above the ground. The lateral guide may be any suitable mechanism and may include a motor (e.g., an electrical motor) for providing lateral motion to the ground contacting structure. The lateral guide may include a set of supporting structures (e.g., rails) for holding and moving the ground contacting structure laterally (i.e., substantially parallel to the ground) towards the housing.

In various embodiments, the coupling mechanism includes a sensor (or several sensors) configured to detect whether the ground contacting structure is disposed in the housing. In an example embodiment, the sensor may be a positional sensor (e.g., an optical sensor including a laser and a photodiode) for determining a location of the ground contacting structure relative to the housing. Additionally, or alternatively, the sensor may include a weight sensor, a proximity sensor to one or more surfaces of the housing, or any other suitable sensor for determining the position and/or orientation of the ground contacting structure relative to the housing.

An autonomous vehicle may further include a control system operatively coupled to the housing coupling mechanism configured to perform control operations, including receiving instructions for towing the aircraft. In an example embodiment, the instructions may be generated by a human operator or by a software application configured to control operations of the autonomous vehicles at the aircraft facility. The instructions may include a location to which the aircraft is to be towed.

In an example embodiment, the control system may identify the ground contacting structure of the aircraft, and engage the ground contacting structure via the coupling mechanism. For example, the control system may activate various mechanisms for engaging the ground contacting structure (e.g., the control system may activate a rotation of ramp 331 about a central axis of ramp 331 (see FIG. 12A), or safety latch 333 (see FIG. 12B)). Further, the control system is configured to facilitate placing the ground contacting structure into the housing, and to control a drivetrain of the vehicle for towing the aircraft to the location. Further, the control system may further include a GPS sensor by which the control system can determine location of vehicle.

In some cases, the control system of the autonomous vehicle may also include one or more sensors configured to detect objects near the vehicle. In an example embodiment, a sensor may be a lidar, a camera, a radar, or any other suitable sensor (e.g., a laser coupled with a photodetector) configured to detect objects near the vehicle. Additionally, or alternatively, the sensor may include an ultrasonic device for generating and sensing an ultrasound sound.

In various embodiments, the control system may further include a communication device configured to support a near-field communication, for communicating with other communication devices adjacent to the vehicle. In some cases, the near-field communication may include any suitable near-field communication (NFC) approach (e.g., Bluetooth, passive NFC, active NFC, near field magnetic induction-based communication, and the like). In some cases, NFC communication may include radio frequency identification tags (RFIDs). In an example embodiment, NFC communication may be configured to only work over short distances (e.g., a few feet, a few tens of feet, or a few hundreds of feet) to prevent NFC communication signal from an autonomous vehicle to overlap with NFC communication signals of other vehicles. In some cases, a limited range of the NFC communication may also be useful to prevent third party hacking attacks to the operations of the autonomous vehicle (e.g., having a short-range signal may prevent the third party from acquiring the signal, and determine characteristics of the short-range signal). In general, NFC communication (or any other communication of the autonomous vehicle) may be encrypted (e.g., via secure asymmetric encryption using private-public keys) and/or may require authentication (i.e., the autonomous vehicle may authenticate itself to an entity with which it is communicating). For example, the autonomous vehicle may authenticate itself with an aircraft facility control center, with other autonomous vehicles or with one or more aircrafts at the aircraft facility. Similarly, any entity that is communicated with the autonomous vehicle may be configured to authenticate itself (e.g., the aircraft facility control center may authenticate itself via a proper authentication protocol such as a secure shell handshake (SSH handshake)).

It should be noted that a control system of an autonomous vehicle may include at least one communication device configured to communicate with other communication devices not only using NFC communication by via any other means such as a radio signal, a visual signal (e.g., flashes of light forming a Morse code communication), audio signal, ultrasound signal, and the like.

In various embodiments, an autonomous vehicle, as described above, includes a motor (e.g., an electrical motor) and a battery configured to supply an electrical power to the electrical motor, and/or to any other components of the autonomous vehicle that require electrical power (e.g., computing unit 170, and the like). In various embodiments, the vehicle is configured to self-charge the battery at a charging station located in the vicinity (or at the premises) of an aircraft facility.

As described above, in some embodiments, the autonomous vehicle is configured to self-navigate to a suitable charging station (e.g., the autonomous vehicle may determine via its control system or/and by interacting with a control system of the aircraft facility which charging station is available (or closest and available) for charging the autonomous vehicle). Once the charging station is identified, the autonomous vehicle may be configured to proceed to the charging station for autonomously charging (when it is determined that the autonomous vehicle requires charging, for example, based on the battery power levels detected by a control system of the autonomous vehicle). In some cases, a human operator may supervise (or facilitate in any suitable way) the charging of the autonomous vehicle.

In various embodiment, an aircraft facility includes one or more control systems for controlling various aspects of the operation of the aircraft facility (herein, aircraft facility control system is abbreviated as AFCS). The one or more control systems is configured to control various sensors (e.g., sensors determining the position of an aircraft while landing, parking or taking off from the aircraft facility, sensors determining weight, size, and type of ground contacting structures, of various aircrafts stationed at the aircraft facility, sensors for determining velocities (vector quantities) of the aircraft, sensors for determining position and velocities of various autonomous vehicles at the aircraft facility, or any other suitable sensors) for facilitating operations of the aircraft facility. In an example embodiment, sensors may include radars, Lidars, cameras, photodiodes, ultrasound detectors, weight measurement devices, current measurement devices, and the like. In some cases, sensors may be supplemented with signal emitting devices such as ultrasound generators or light emitting devices (e.g., lasers). For example, a pair of a laser and a photodiode may be used to determine a location of an object as known in art. In various embodiments, cameras may be used to determine a location of ground contacting structures of one or more aircraft. For instance, the orientation of the cameras may be used for a triangulation procedure to accurately determine a location of a ground contacting structure of a particular aircraft. In some cases, a time-of-flight of a laser light may be used for determining locations of various ground contacting structures.

Further, a computer vision system associated with one or more cameras (the computer vision system may be either part of the control system of an autonomous vehicle or may be part of the control system of the aircraft facility) may be used to determine a type of the ground contacting structure (e.g., whether the ground contacting structure is a wheel, a skid, or a float, a size of the ground contacting structure, a weight of the aircraft having the ground contacting structure, and the like).

In various embodiments, the one or more control systems for controlling various aspects of the operation of the aircraft facility (AFCSs) may control at least some aspects of operations of autonomous vehicles. For example, an AFCS may send instructions to an autonomous vehicle to move to a particular aircraft and to tow the aircraft to a particular parking location in which the aircraft is to be placed. AFCS may control deploying one or more autonomous vehicles towards the location of a ground contacting structure of the aircraft. In turn, the autonomous vehicle may receive the instructions from the AFCS and may execute various operations (e.g., moving towards the location of the ground contacting structure of the aircraft by navigating to the ground contacting structure, as described above, engaging the ground contacting structure via a coupling mechanism, placing the ground contacting structure into the housing (e.g., platform 235, as shown in FIG. 9C); and towing the aircraft to the parking location. In various embodiments, at least some of the operations (e.g., determining an optimal navigational path to the ground contacting structure, determining the location of the ground contacting structure with at least a centimeter accuracy, communicating with an RFID tag associated with the ground contacting structure, aligning a ramp (e.g., ramp 232, as shown in FIG. 9C) with the ground contacting structure, and the like may be performed by a control system associated with the autonomous vehicle). In an example embodiment, the control operations performed by the control system associated with the autonomous vehicle include computing a towing path based on other vehicles present in a vicinity of the autonomous vehicle. In some cases, when an aircraft requires an electrical power supply, the autonomous vehicle may also be configured to supply an electrical power to the aircraft via any suitable electrical connection (e.g., high power electrical connector similar to, for example, to a Tesla NEMA connector). In some cases, a supply of the electrical power to the aircraft is used to charge one or more batteries of the aircraft.

The invention claimed is:

1. A vehicle comprising:
 a chassis for supporting a ground contacting structure of an aircraft, the chassis including:
  a housing for holding the ground contacting structure;
  a drivetrain; and
  a coupler configured to:
   facilitate placing the ground contacting structure into the housing; and
   secure the ground contacting structure in the housing; and
 a controller operatively coupled to the chassis, the controller configured to:
  receive instructions including an indication to tow an aircraft; and
  navigate the chassis to the aircraft and couple the chassis to the aircraft using the coupler by fusing signals from a plurality of sensors including at least two different types of sensors, navigating the chassis including:
   operating the drivetrain to cause the chassis to travel to a waypoint associated with an approximate location of the ground contacting structure of the aircraft using at least one sensor from a first subset of sensors of the plurality of sensors;
   detecting an identification tag coupled to the ground contacting structure using at least one sensor from a second subset of sensors of the plurality of sensors while at the waypoint, the second sensor being a different type of sensor from the first sensor; and
   sending signals, based on data from the at least one sensor from the second subset of sensors to the drivetrain to precisely maneuver the chassis relative to the ground contacting structure and to the coupler to engage the ground contacting structure.

2. The vehicle of claim 1, wherein the ground contacting structure is one of a wheel, a skid, or a float.

3. The vehicle of claim 1, wherein the ground contacting structure is a wheeled nose landing gear.

4. The vehicle of claim 1, wherein the coupler includes:
 a ramp extending from the housing to a free end and along which the ground contacting structure can be moved from the free end to the housing, and
 a movable element for opening and closing the housing to secure the ground contacting structure in the housing.

5. The vehicle of claim 1, wherein the coupler includes an opening in the housing.

6. The vehicle of claim 1, wherein the coupler includes a lifting mechanism configured to lift the ground contacting structure from a surface on which vehicle and the ground contacting structure are disposed.

7. The vehicle of claim 1, wherein the coupler includes a lateral guide mechanism configured to guide the ground contacting structure into the housing.

8. The vehicle of claim 1, wherein the coupler includes a sensor configured to detect whether the ground contacting structure is disposed in the housing.

9. The vehicle of claim 1, wherein the drivetrain includes one or more electric motors.

10. The vehicle of claim 1, wherein: the first subset of sensors includes a GPS sensor, the GPS sensor used by the controller while operating the drive train to cause the chassis to travel to the waypoint, the controller further configured to:
 determine a handoff point, the handoff point being a point on a path while navigating to the aircraft that is a maximum distance at which the at least one sensor from the second subset of sensors can resolve the identification tag,
 the signals to the drivetrain to precisely maneuver the chassis sent after the chassis reaches the handoff point.

11. An autonomous vehicle comprising:
 a chassis for supporting a ground contacting structure of an aircraft, the chassis including:
  a housing configured to hold the ground contacting structure;
  a drivetrain; and
  a coupler configured to:
   facilitate placing the ground contacting structure into the housing; and
   secure the ground contacting structure in the housing;

a controller operatively coupled to the drivetrain and the coupler, the controller configured to perform control operations including:

receiving instructions for towing the aircraft, the instructions including a location to which the aircraft is to be towed;

detecting an identification tag coupled to the ground contacting structure of the aircraft using data provided from a first sensor from a plurality of sensors;

sending signals to the coupler and the drivetrain for engaging the ground contacting structure using the coupler, including precise maneuvering of the drivetrain based on the data provided by the first sensor; and operating the drivetrain of the autonomous vehicle for towing the aircraft to the location, including navigating using a second sensor from the plurality of sensors, the second sensor being a different type of sensor from the first sensor.

12. The vehicle of claim 11, wherein the second sensor is a GPS sensor by which the controller can determine location of vehicle.

13. The vehicle of claim 11, wherein:
the first sensor is from a first subset of sensors from the plurality of sensors, each sensor from the first subset of sensors configured to detect objects near the vehicle; and
the first sensor is least one of a lidar or a camera.

14. The vehicle of claim 11, wherein the first sensor is from a first subset of sensors from the plurality of sensors, the first subset of sensors configured to detect objects near the vehicle and including an ultrasonic sensor.

15. The vehicle of claim 11, wherein the first sensor is from a first subset of sensors from the plurality of sensors, the first subset of sensors configured to detect the identification tag and including a near field communication detector.

16. The vehicle of claim 11, further comprising:
an electrical motor; and
a battery configured to supply an electrical power to the electrical motor,
wherein the vehicle is configured to self-charge the battery at a charging station.

17. The vehicle of claim 11, wherein the first sensor is configured to determine a location of the ground contacting structure relative to the coupler with at least a centimeter accuracy.

18. The vehicle of claim 11, wherein the control operations performed by the control system further includes computing a towing path based on other vehicles present in a vicinity of the autonomous vehicle.

19. The vehicle of claim 11, wherein the autonomous vehicle is further configured to supply an electrical power to the aircraft.

20. The vehicle of claim 19, wherein a supply of the electrical power to the aircraft is used to charge one or more batteries of the aircraft.

21. The vehicle of claim 11, wherein the controller is further configured to:
navigate the chassis towards the aircraft using the second sensor, the second sensor being a GPS sensor; and
determine a handoff point, the handoff point being a point on a path while navigating towards the aircraft that is a maximum distance at which the first sensor can resolve the identification tag,
the signals sent to the coupler and the drivetrain for engaging the ground contacting structure sent after the chassis reaches the handoff point.

* * * * *